US012089013B2

(12) United States Patent
Sakuraba et al.

(10) Patent No.: US 12,089,013 B2
(45) Date of Patent: Sep. 10, 2024

(54) AUDIO PROCESSING DEVICE HAVING MICROPHONES ARRANGED WITH DIFFERENT SPACING AND DIAMETERS

(71) Applicant: Sony Group Corporation, Tokyo (JP)

(72) Inventors: Yohei Sakuraba, Tokyo (JP); Yuuji Hirasawa, Tokyo (JP); Eiji Chihara, Tokyo (JP); Atsushi Masuda, Tokyo (JP); Junsei Abe, Tokyo (JP)

(73) Assignee: Sony Group Corporation, Tokyo (JP)

(*) Notice: Subject to any disclaimer, the term of this patent is extended or adjusted under 35 U.S.C. 154(b) by 406 days.

(21) Appl. No.: 17/612,308

(22) PCT Filed: Apr. 3, 2020

(86) PCT No.: PCT/JP2020/015308
§ 371 (c)(1),
(2) Date: Nov. 18, 2021

(87) PCT Pub. No.: WO2020/241050
PCT Pub. Date: Dec. 3, 2020

(65) Prior Publication Data

US 2022/0167085 A1 May 26, 2022

(30) Foreign Application Priority Data

May 28, 2019 (JP) ................................ 2019-098975

(51) Int. Cl.
*H04R 3/00* (2006.01)
*H04R 1/26* (2006.01)

(52) U.S. Cl.
CPC ............ *H04R 3/005* (2013.01); *H04R 1/265* (2013.01); *H04R 2430/03* (2013.01)

(58) Field of Classification Search
CPC . H04R 1/26; H04R 1/265; H04R 3/00; H04R 3/005; H04R 2430/03; H04R 2430/23; H04R 2499/11
USPC .......................................... 381/92, 95, 122
See application file for complete search history.

(56) References Cited

U.S. PATENT DOCUMENTS

| | | | | |
|---|---|---|---|---|
| 6,760,449 | B1 | 7/2004 | Matsuo | |
| 11,290,814 | B1 * | 3/2022 | Hook | H04R 29/005 |
| 2012/0070015 | A1 * | 3/2012 | Oh | H04R 3/005 381/92 |
| 2013/0142349 | A1 | 6/2013 | Liu et al. | |
| 2017/0070815 | A1 | 3/2017 | Mitsufuji | |
| 2018/0279042 | A1 * | 9/2018 | Mitsufuji | G01S 3/808 |
| 2021/0051401 | A1 * | 2/2021 | Liu | H04R 3/005 |

(Continued)

FOREIGN PATENT DOCUMENTS

| | | | |
|---|---|---|---|
| JP | 2000-134688 | A | 5/2000 |
| JP | 2000-354290 | A | 12/2000 |
| JP | 2007-6474 | A | 1/2007 |

(Continued)

OTHER PUBLICATIONS

International Search Report issued on Jun. 30, 2020 in PCT/JP2020/015308 filed Apr. 3, 2020, 3 pages.

*Primary Examiner* — Harry S Hong
(74) *Attorney, Agent, or Firm* — Oblon, McClelland, Maier & Neustadt, L.L.P.

(57) ABSTRACT

To provide an audio processing device including a configuration in which a different microphone is used for generation of directivity depending on a frequency band.

14 Claims, 12 Drawing Sheets

(56) References Cited

U.S. PATENT DOCUMENTS

2022/0167083 A1 * 5/2022 Koizumi ................ H04R 5/027

FOREIGN PATENT DOCUMENTS

| | | | |
|---|---|---|---|
| JP | 2007-27939 | A | 2/2007 |
| JP | 2013-542677 | A | 11/2013 |
| JP | 2016-149612 | A | 8/2016 |
| WO | WO 2015/137146 | A | 9/2015 |

* cited by examiner

AUDIO PROCESSING DEVICE HAVING MICROPHONES ARRANGED WITH DIFFERENT SPACING AND DIAMETERS

TECHNICAL FIELD

The present technology relates to an audio processing device, an audio processing method, and a program.

BACKGROUND ART

A technology for generating an audio signal having a predetermined directivity by using an output signal from a microphone is known (see, for example, Patent Document 1 below).

CITATION LIST

Patent Document

Patent Document 1: Japanese Patent Application Laid-Open No. 2007-6474

SUMMARY OF THE INVENTION

Problems to be Solved by the Invention

In this technical field, it is desired to be able to generate an audio signal having a predetermined directivity and favorable characteristics.

It is therefore an object of the present technology to provide an audio processing device, an audio processing method, and a program capable of generating an audio signal having a predetermined directivity and favorable characteristics.

Solutions to Problems

In order to solve the problem described above, the present technology provides an audio processing device including a configuration in which a different microphone is used for generation of directivity depending on a frequency band.

Furthermore, the present technology provides an audio processing method in which a different microphone is used for generation of directivity depending on a frequency band.

Furthermore, the present technology provides a program for causing a computer to execute an audio processing method in which a different microphone is used for generation of directivity depending on a frequency band.

MODE FOR CARRYING OUT THE INVENTION

Embodiments of the present technology will be described below with reference to the drawings. Note that the embodiments described below are preferred specific examples of the present technology with a wide variety of technically preferable limitations. However, the scope of the present technology is not limited to these embodiments unless a description to limit the present technology is given below. The present technology will be described in the following order.

<<1. First embodiment>>
<<2. Second embodiment>>
<<3. Third embodiment>>
<<4. Modified example>>
<<5. Application example>>

1. First Embodiment

[1-1. Configuration of Audio Processing Device]

Figure 1:
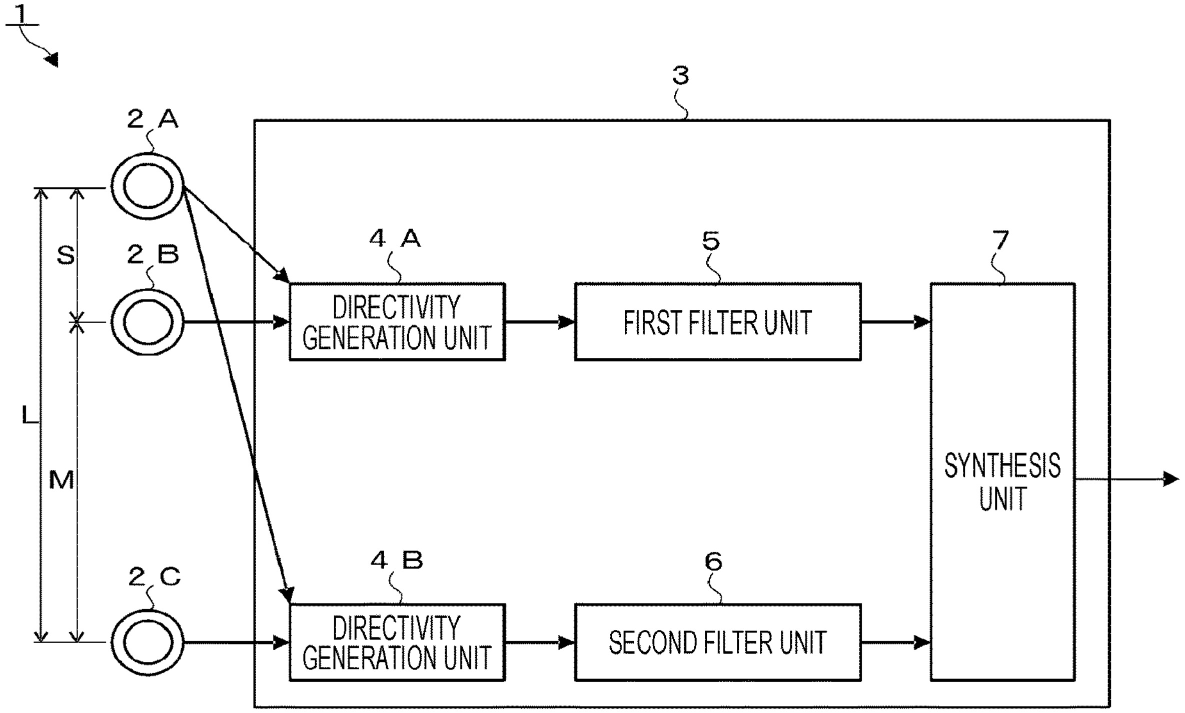
FIG. 1 is a block diagram illustrating a configuration example of an audio processing device according to a first embodiment.

FIG. 1 is a block diagram illustrating a configuration example of an audio processing device according to a first embodiment. An audio processing device 1 illustrated in FIG. 1 is capable of generating unidirectional audio signals such as a cardioid, a supercardioid, or a hypercardioid. For example, the audio processing device 1 is used as an external microphone device for camera equipment capable of recording a sound, and is used for, for example, emphasizing a sound in a front direction. Note that the audio processing device 1 can also be used for a general microphone array including a plurality of microphones. The audio processing device 1 includes three or more microphones. In the present embodiment, the audio processing device 1 includes three microphones 2A, 2B, and 2C, and a signal processing unit 3, as illustrated.

Each of the microphones 2A, 2B, and 2C outputs a collected sound as an audio signal. Specifically, each of the microphones 2A, 2B, and 2C includes a microphone unit (not illustrated), and has a configuration in which sound (air vibration) received by a vibration unit such as a diaphragm is converted into an audio signal and the audio signal is output. For example, the converted audio signal is an analog signal, and is amplified by an amplifier (not illustrated) and converted into a digital signal by an analog-to-digital conversion unit (not illustrated) when being input to the signal processing unit 3. Note that the amplifier and the analog-to-digital conversion unit may be provided in a unit other than the signal processing unit 3.

The microphones 2A, 2B, and 2C all have the same characteristics (directivity pattern, frequency response, noise performance, and the like). Specifically, all of the microphones 2A, 2B, and 2C have the same configuration and an omnidirectional directivity pattern. For example, the three microphones 2A, 2B, and 2C are capable of outputting each of audio signals collected at the same time.

The microphones 2A, 2B, and 2C are linearly arrayed as illustrated. For example, the audio processing device 1 is used in such a way that the microphones 2A, 2B, and 2C are directed toward a sound source and are linearly arranged. Then, in the present embodiment, a space S between the microphone 2A at one end and the microphone 2B at the center (the distance between the centers of diameters of the microphones 2A and 2B) is smaller than a space L between the microphone 2A and the microphone 2C at the other end. Note that, in the present embodiment, the space S is smaller than a space M between the microphones 2B and 2C, but the space S and the space M may be equal, that is, the microphones may be equally spaced. Note that, in the present embodiment, spaces between the microphones cannot be adjusted, that is, a fixed microphone array is used.

On the other hand, the signal processing unit 3 is constituted by, for example, a digital signal processor (DSP), a central processing unit (CPU), or the like, and includes, as functional blocks, two directivity generation units 4A and 4B, a first filter unit 5, a second filter unit 6, and a synthesis unit 7. The signal processing unit 3 performs directivity processing (described later) using these functional blocks on audio signals input from the microphones 2A, 2B, and 2C, thereby generating and outputting the audio signals having unidirectionality described above. For example, the signal processing unit 3 reads a program stored in a memory (not illustrated) and executes the read program to cause each functional block to function. Note that the program to be read may be a program recorded in a recording medium, a program provided through a telecommunication line, or the like.

Each of the directivity generation units 4A and 4B generates unidirectional audio signals by using two or more audio signals among audio signals output from the three microphones 2A, 2B, and 2C. Each of the directivity generation units 4A and 4B uses a beamforming technology as a technique for generating directivity. Although detailed description is omitted here, the beamforming technology is a technology that uses a plurality of microphones, and uses a difference in arrival time of a sound, a phase difference, or the like between the microphones to allow a sound in a specific direction to be emphasized or suppressed. For example, as an example of this beamforming technique, a technique called a two-microphone integration method is known.

Figure 2:
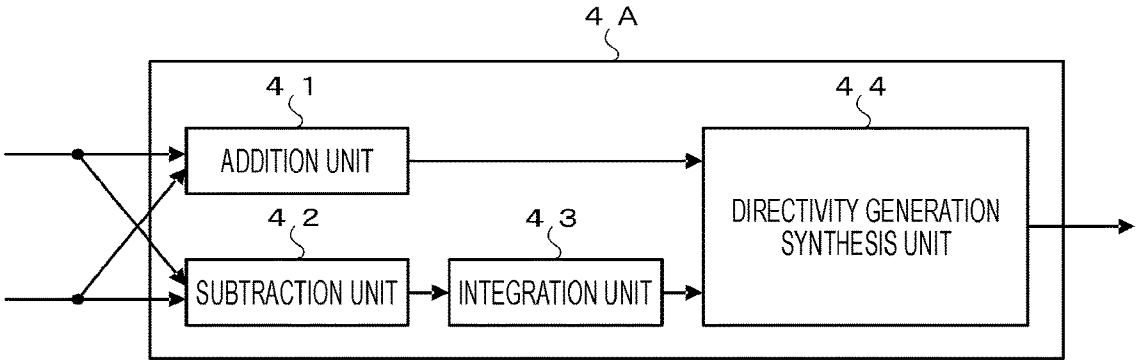
FIG. 2 is a block diagram illustrating a configuration example of a directivity generation unit.

FIG. 2 is a block diagram illustrating a configuration example of the directivity generation unit 4A. The directivity generation unit 4A in this example includes an addition unit 41, a subtraction unit 42, an integration unit 43, and a directivity generation synthesis unit 44. Each of the microphones 2A and 2B described above is connected to the addition unit 41. The addition unit 41 performs addition processing on two audio signal that are input, and outputs an omnidirectional audio signal.

Furthermore, each of the microphones 2A and 2B is also connected to the subtraction unit 42. The subtraction unit 42 performs subtraction processing on two audio signals that are input, and outputs a figure-eight bi-directional audio signal. The subtraction unit 42 is connected to the integration unit 43. The integration unit 43 performs integration processing on an input audio signal and outputs the processed audio signal. By the integration processing, the frequency response is equalized from a low frequency to a high frequency, and it is possible to eliminate a defect (e.g., no sound is output) at a low frequency caused by the subtraction processing described above.

Each of the addition unit 41 and the integration unit 43 is connected to the directivity generation synthesis unit 44. The directivity generation synthesis unit 44 performs synthesis from two input audio signals, that is, an omnidirectional audio signal and a bi-directional audio signal, at a predetermined ratio (weighting), and outputs an audio signal having unidirectionality in accordance with the ratio. This ratio is adjusted in accordance with a user's instruction via an operation unit (not illustrated) or the like, and thus the directivity generation synthesis unit 44 can generate a wide variety of unidirectional audio signals such as cardioid, supercardioid, and hypercardioid, in addition to omnidirectional. That is, sharpness of the directivity can be changed.

Note that the beamforming technique in the directivity generation unit 4A is not limited to the two-microphone integration method as illustrated in FIG. 2. For example, it is possible to increase the number of microphones, and use three or more audio signals output from each of the microphones to generate a unidirectional audio signal. For example, as another known technique, a three-microphone integration method, delay-and-sum beamforming, filter-and-sum beamforming, adaptive beamforming, or the like may be used. Furthermore, a technology other than beamforming may be applied as long as directivity can be similarly generated by using an input audio signal.

Returning to the description of FIG. 1, the directivity generation unit 4B has a configuration similar to that of the directivity generation unit 4A. However, the directivity generation unit 4B is connected to the microphones 2A and 2C, and generates and outputs a unidirectional audio signal by using two audio signals input from the microphones 2A and 2C. Note that each of the directivity generation units 4A and 4B may use a different technique.

The directivity generation unit 4A is connected to the first filter unit 5, and the directivity generation unit 4B is connected to the second filter unit 6. The first filter unit 5 and the second filter unit 6 perform, on an input audio signal, filtering processing for extracting only a necessary frequency band. Note that, among combinations of the microphones 2A, 2B, and 2C, the first filter unit 5 that processes audio signals of the microphones 2A and 2B, which are a combination with a narrower space (space S), is configured to extract a high-frequency band as compared with the second filter unit 6 (in other words, remove a low-frequency component). On the other hand, the second filter unit 6 that processes audio signals of the microphones 2A and 2C, which are a combination with a wider space (space L), is configured to extract a low-frequency band as compared with the first filter unit 5 (in other words, remove a high-frequency component). Specifically, the first filter unit 5 is constituted by a high pass filter (HPF), and the second filter unit 6 is constituted by a low pass filter (LPF).

Each of the first filter unit 5 and the second filter unit 6 is connected to the synthesis unit 7. The synthesis unit 7 performs synthesis by combining two input audio signals to generate and output an audio signal having unidirectionality.

[1-2. Directivity Processing by Audio Processing Device]

In the audio processing device 1 illustrated in FIG. 1, first, each of the microphones 2A, 2B, and 2C outputs a collected audio signal to the signal processing unit 3. Specifically, the microphone 2A outputs an audio signal to the directivity generation units 4A and 4B, the microphone 2B outputs an audio signal to the directivity generation unit 4A, and the microphone 2C outputs an audio signal to the directivity generation unit 4B.

In the signal processing unit 3, the directivity generation unit 4A performs the following processing. The input signals from the microphones 2A and 2B described above are input to each of the addition unit 41 and the subtraction unit 42 of the directivity generation unit 4A illustrated in FIG. 2. The addition unit 41 performs addition processing for adding the input signals from the microphones 2A and 2B to generate an omnidirectional audio signal, and outputs the omnidirectional audio signal to the directivity generation synthesis unit 44. The subtraction unit 42 performs subtraction processing for subtracting the input signals from the microphones 2A and 2B to generate a bi-directional audio signal, and outputs the bi-directional audio signal to the integration unit 43. The integration unit 43 performs integration processing on the input signal from the subtraction unit 42 and outputs the signal to the directivity generation synthesis unit 44. The directivity generation synthesis unit 44 performs synthesis from the input signal from the addition unit 41 and the input signal from the integration unit 43 at a predetermined ratio to generate a unidirectional audio signal, and outputs the unidirectional audio signal to the first filter unit 5 illustrated in FIG. 1. The first filter unit 5 extracts a high-frequency band from an input signal input from the directivity generation unit 4A, and outputs the frequency band to the synthesis unit 7.

On the other hand, the directivity generation unit 4B performs processing similar to that of the directivity generation unit 4A described above by using the input signals from the microphones 2A and 2C to generate a unidirectional audio signal, and outputs the unidirectional audio signal to the second filter unit 6. Then, the second filter unit 6 extracts a low-frequency band from the input signal input from the directivity generation unit 4B, and outputs the frequency band to the synthesis unit 7. The synthesis unit 7 combines the input signals from the first filter unit 5 and the second filter unit 6, thereby finally generating and outputting one audio signal having unidirectionality. Note that it is also possible to generate an omnidirectional audio signal by changing the ratio.

Figure 3:
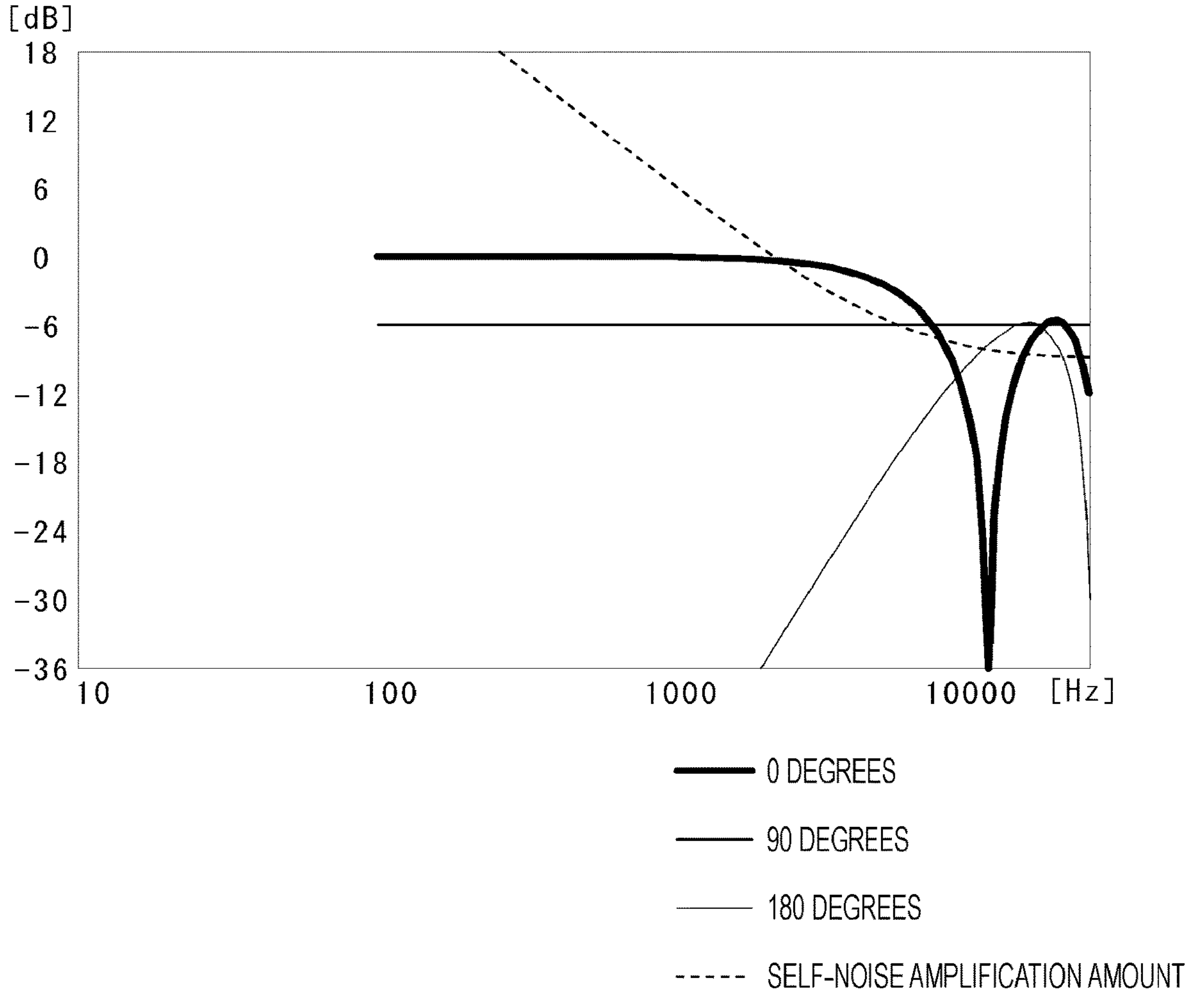
FIG. 3 is a graph illustrating a characteristic example of an audio signal in a case where microphones are narrowly spaced.
Figure 4:
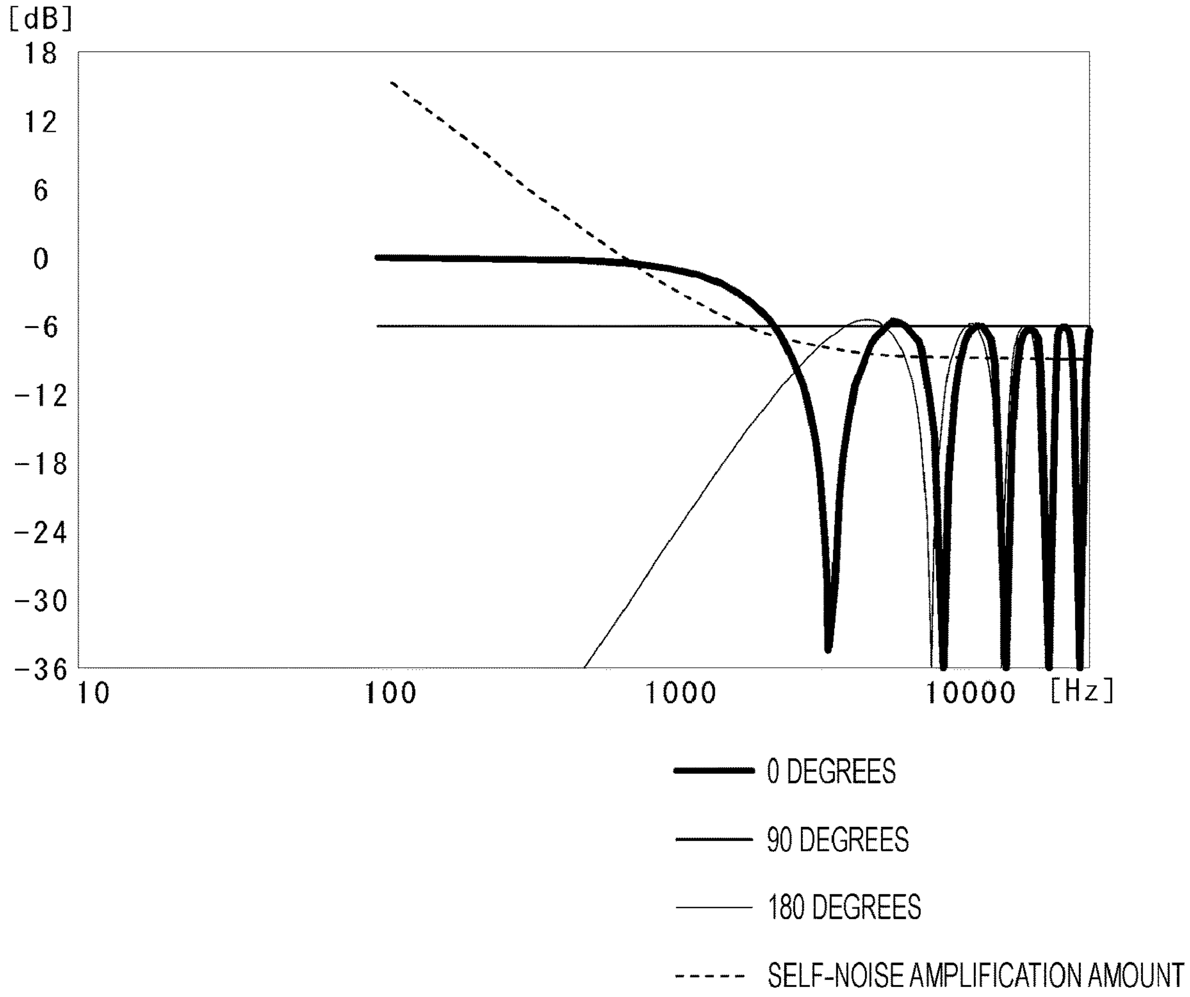
FIG. 4 is a graph illustrating a characteristic example of an audio signal in a case where microphones are widely spaced.

Here, characteristics of audio signals after being processed by the directivity generation units 4A and 4B will be described. FIG. 3 is a graph illustrating a characteristic example of an audio signal in a case where microphones are narrowly spaced. FIG. 4 is a graph illustrating a characteristic example of an audio signal in a case where microphones are widely spaced. More specifically, each of FIGS. 3 and 4 illustrates the frequency response and the noise performance in a case where an audio signal having a cardioid directivity is generated. Specifically, FIG. 3 illustrates characteristics in a case where the space between microphones (space S) is two centimeters, and FIG. 4 illustrates characteristics in a case where the space between microphones (space L) is seven centimeters.

Comparing FIGS. 3 and 4, in the case of the narrowly spaced microphones (space S) illustrated in FIG. 3, the band in which a favorable directivity is obtained (the band in which the line of 0 degrees in the front direction maintains a value close to 0 dB) extends to about 8,500 Hz, but a self-noise amplification amount, that is, the amount of noise included in outputs from the microphones is large. Note that the self-noise amplification amount increases as the frequency is lower. On the other hand, in the case of the wider space (space L) illustrated in FIG. 4, the band in which directivity is obtained is limited to up to about 2,400 Hz, but it can be seen that the self-noise amplification amount is small. That is, the frequency at which directivity is obtained and the amount of noise are in a trade-off relationship.

Thus, as described above, the signal processing unit 3 extracts, as a necessary band, a band in which directivity is obtained and a self-noise amplification amount is small, from each of the unidirectional audio signal obtained from the input signals from the microphones 2A and 2B and the unidirectional audio signal obtained from the input signals from the microphones 2A and 2C. Then, the extracted two audio signals are combined into a unidirectional audio signal, and the generated unidirectional audio signal is output. Note that a band that satisfies either the directivity or the self-noise amplification amount may be extracted.

The band extraction by the first filter unit 5 and the second filter unit 6 and the synthesis by the synthesis unit 7 are not limited to specific techniques, and a wide variety of known techniques can be used. For example, a technique called crossover processing can be applied to this processing by the first filter unit 5, the second filter unit 6, and the synthesis unit 7. In the case of the examples illustrated in FIGS. 3 and 4, the frequency for dividing the band in the processing by the first filter unit 5 and the second filter unit 6 may be set to, for example, 2,000 Hz. That is, for 2,000 Hz or less, audio signals from the combination of the microphones 2A and 2C are used, and for 2,000 Hz or more, audio signals from the combination of the microphones 2A and 2B are used, for generation of an audio signal having unidirectionality. With this arrangement, it is possible to achieve both low self-noise and expansion of a frequency band in which directivity is obtained.

As described above, in a case where an audio signal having a predetermined directivity is generated by beamforming using output signals from a plurality of microphones, characteristics of the generated audio signal changes in accordance with the space between the microphones. Thus, the audio processing device 1 extracts only a necessary band by using both one dedicated to a low frequency and one dedicated to a high frequency, and generates an audio signal having favorable characteristics by combining the two extracted audio signals.

As described above, in the present technology, the audio processing device 1 has a configuration in which the microphones used for generation of directivity differ depending on the frequency band. With this arrangement, a favorable audio signal having unidirectionality can be generated with the use of appropriate microphones for each frequency band.

Furthermore, for generation of directivity, the audio processing device 1 uses a combination of two microphones (microphones 2A and 2B, or microphones 2A and 2C), and uses two combinations of the microphones with spaces that are different from each other (space S<space L), thereby generating two audio signals having unidirectionality each. With this arrangement, it is possible to perform processing in consideration of the characteristics of the two audio signals having unidirectionality.

Moreover, the audio processing device 1 uses a combination with a narrower space (space S) for a high frequency, and a combination with a wider space (space L) for a low frequency. That is, the directivity generation unit 4A generates an audio signal for a high frequency by the combination of the narrowly spaced microphones 2A and 2B, and the directivity generation unit 4B generates an audio signal for a low frequency by the combination of the widely spaced microphones 2A and 2C. With this arrangement, by appropriately setting the distance between the microphones, it is possible to achieve low noise and directivity output in a wide band from a low frequency to a high frequency. That is, it is possible to achieve both an expansion of the frequency at which ideal directivity is obtained, and a reduction of self-noise.

2. Second Embodiment

[2-1. Configuration of Audio Processing Device]

Figure 5:
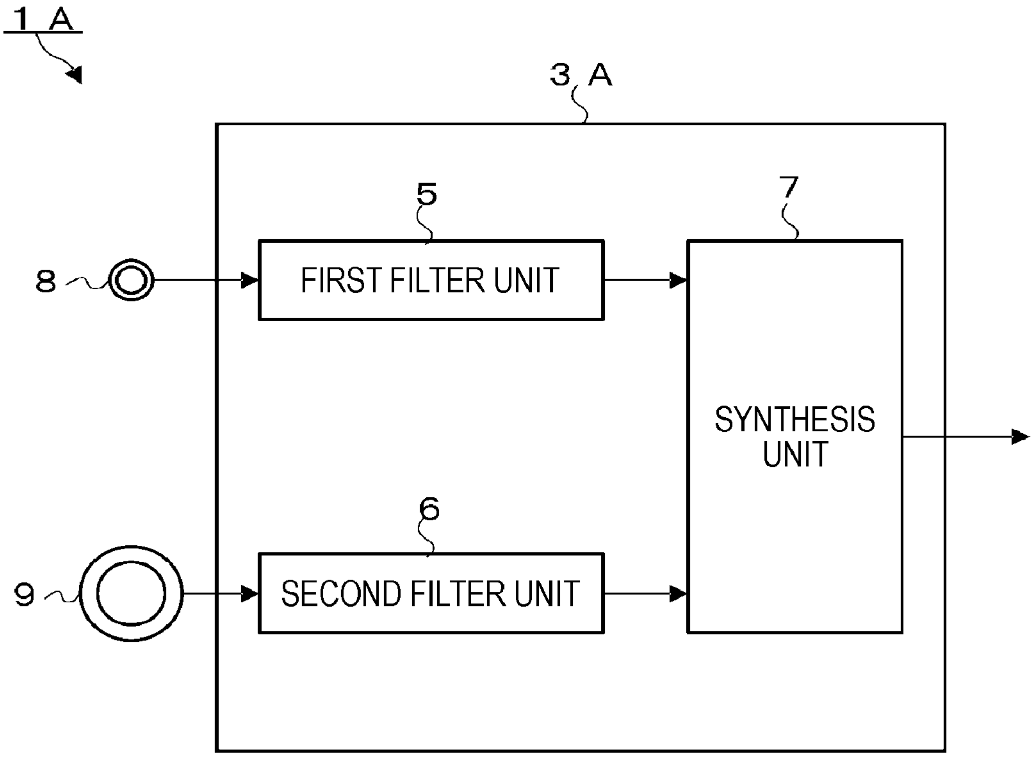
FIG. 5 is a block diagram illustrating a configuration example of an audio processing device according to a second embodiment.

FIG. 5 is a block diagram illustrating a configuration example of an audio processing device according to a second embodiment. Note that, in the second embodiment, parts similar to those of the first embodiment are denoted by the same reference numerals, and the description thereof will be omitted or simplified. An audio processing device 1A in the present embodiment includes two microphones 8 and 9 and a signal processing unit 3A. The signal processing unit 3A includes the first filter unit 5, the second filter unit 6, and the synthesis unit 7 described above.

Both the microphones 8 and 9 have a predetermined unidirectionality (have a directional microphone unit) by a microphone capsule itself. Furthermore, as illustrated, each of the microphones 8 and 9 has a different microphone diameter (diameter of the microphone unit). More specifically, the microphone 8 has a smaller microphone diameter than the microphone 9. Specifically, the microphones 8 and 9 have different characteristics (frequency response, noise performance, and the like) from each other. Note that the directivity patterns are preferably the same, and the level of sameness required is that, for example, they are both unidirectional. The individual other configurations (e.g., a configuration for outputting an audio signal, and the like) of the microphones 8 and 9 are similar to those of the microphones 2A, 2B, and 2C in the first embodiment described above. However, in the present embodiment, the signal processing unit 3A handles an analog audio signal.

The microphone 8 is connected to the first filter unit 5 of the signal processing unit 3A, and the microphone 9 is connected to the second filter unit 6 of the signal processing unit 3A. Then, the first filter unit 5 and the second filter unit 6 are connected to the synthesis unit 7.

[2-2. Directivity Processing by Audio Processing Device]

In the audio processing device 1A illustrated in FIG. 5, first, each of the microphones 8 and 9 outputs a collected audio signal to the signal processing unit 3A. Specifically, the microphone 8 outputs a unidirectional audio signal to the first filter unit 5, and the microphone 9 outputs a unidirectional audio signal to the second filter unit 6.

In the signal processing unit 3A, the first filter unit 5 extracts a high-frequency band from the input signal input from the microphone 8, and outputs the frequency band to the synthesis unit 7. On the other hand, the second filter unit 6 extracts a low-frequency band from the input signal input from the microphone 9, and outputs the frequency band to the synthesis unit 7. The synthesis unit 7 combines the input signals from the first filter unit 5 and the second filter unit 6, thereby generating and outputting a unidirectional audio signal.

Here, characteristics of the microphones 8 and 9 will be described. In the microphone 8 having a small microphone diameter, although directivity can be achieved up to a frequency higher than that of the microphone 9, there is a tendency that sensitivity at a low frequency is greatly reduced, and also the amount of noise is increased. On the other hand, in the microphone 9 having a large microphone diameter, although directivity can be achieved up to a frequency lower than that of the microphone 8, and also the amount of noise is reduced, there is a tendency that the directivity is not achieved or the frequency response is not favorable at a high frequency.

Thus, as described above, the signal processing unit 3A extracts, as a necessary band, a band in which directivity is obtained and a self-noise amplification amount is small from each of audio signals output from the microphones 8 and 9, and combines the two extracted audio signals, thereby finally generating and outputting one audio signal having unidirectionality. With this arrangement, it is possible to take advantage of each microphone diameter and reduce disadvantages. Note that a band that satisfies either the directivity or the self-noise amplification amount may be extracted.

In the present technology, the audio processing device 1A has a configuration in which the microphones used for generation of directivity differ depending on the frequency band. With this arrangement, a favorable audio signal having unidirectionality can be generated with the use of appropriate microphones for each frequency band.

Furthermore, the audio processing device 1A uses each of the two microphones 8 and 9 having different diameters to generate two audio signals having unidirectionality. With this arrangement, it is possible to perform processing in consideration of the characteristics of the two audio signals having unidirectionality.

Moreover, the audio processing device 1A uses the microphone 8 having a smaller diameter for a high frequency, and uses the microphone 9 having a larger diameter for a low frequency. With this arrangement, by appropriately setting the diameters of the microphones 8 and 9, it is possible to obtain directivity in a wide range from a low frequency to a high frequency while suppressing noise, and a high-quality unidirectional audio signal can be generated.

3. Third Embodiment

Figure 6:
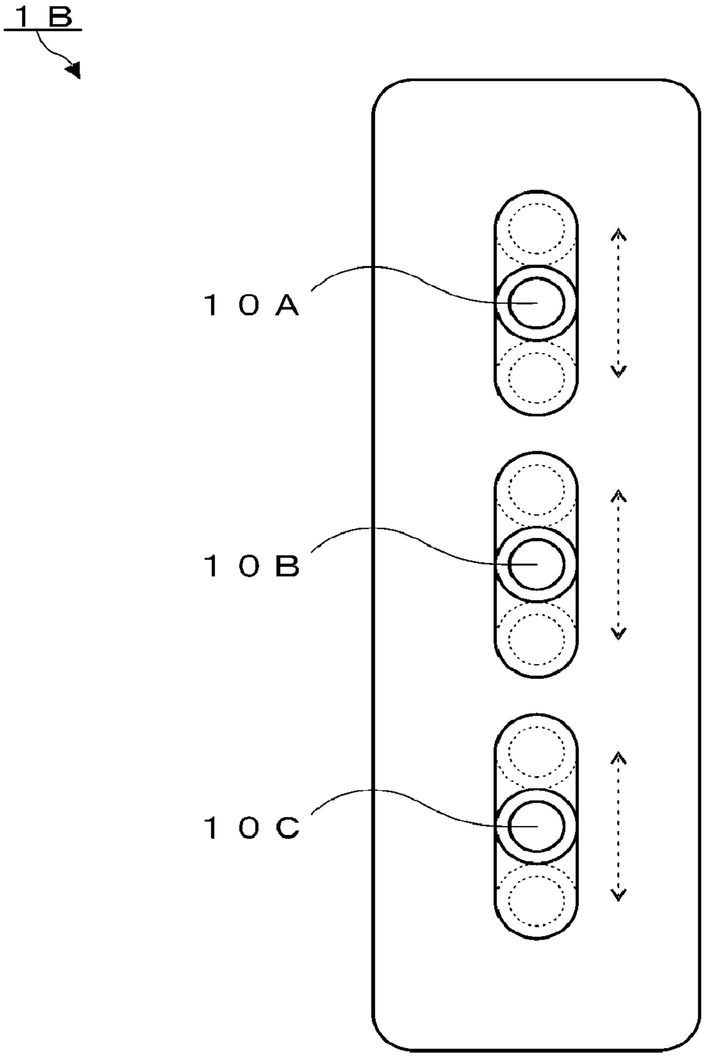
FIG. 6 is a diagram illustrating a configuration example of an audio processing device according to a third embodiment.

FIG. 6 is a diagram illustrating a configuration example of an audio processing device according to a third embodiment. Note that an audio processing device 1B in the present embodiment differs from the first embodiment in that three microphones 10A, 10B, and 100 are included instead of the three microphones 2A, 2B, and 2C in the first embodiment. Other configurations, pieces of processing, and the like are similar to those of the first embodiment, and description thereof is omitted here.

Individual configurations of the microphones 10A, 10B, and 100 are similar to those of the microphones 2A, 2B, and 2C in the first embodiment. Then, the microphones 10A, 10B, and 10C are linearly arrayed as illustrated, and each of the microphones 10A, 10B, and 10C can be moved on the straight line as indicated by a broken line. With this arrangement, the microphones 10A, 10B, and 10C can change their positions on the straight lines to change the spaces with other microphones. For example, the microphone 10A at one end can be moved so that the space between the microphone 10A and the microphone 10B at the center and the space between the microphone 10A and the microphone 10C at the other end are changed.

Note that, in the illustrated example, all of the three microphones 10A, 10B, and 10C can be moved, but a configuration in which at least one of them is movable may be adopted. The structure for allowing the positions of the microphones 10A, 10B, and 10C to be moved is not limited to the illustrated structure, and a wide variety of structures can be adopted.

In the present technology, effects similar to those of the first embodiment described above can be obtained. Moreover, the audio processing device 1A has a structure in which the spaces between the three microphones 10A, 10B, and 10C used for generation of directivity can be adjusted. It is therefore possible to perform flexible tuning by moving the microphones 10A, 10B, and 10C to appropriate positions in accordance with a use case or a type of sound source to be recorded.

4. Modified Example

Although the preferred embodiments of the present technology have been specifically described above, the contents of the present technology are not limited to the embodiments described above, and a wide variety of modifications can be made.

For example, in the first embodiment described above, beamforming has been exemplified as a technique for generating directivity in the directivity generation units 4A and 4B. Furthermore, the crossover processing has been exemplified as the processing in the first filter unit 5, the second filter unit 6, and the synthesis unit 7. The processing of beamforming and crossover may also be performed in a frequency domain. That is, processing similar to that of the first embodiment may be performed with a time axis converted into a frequency axis.

Figure 7:
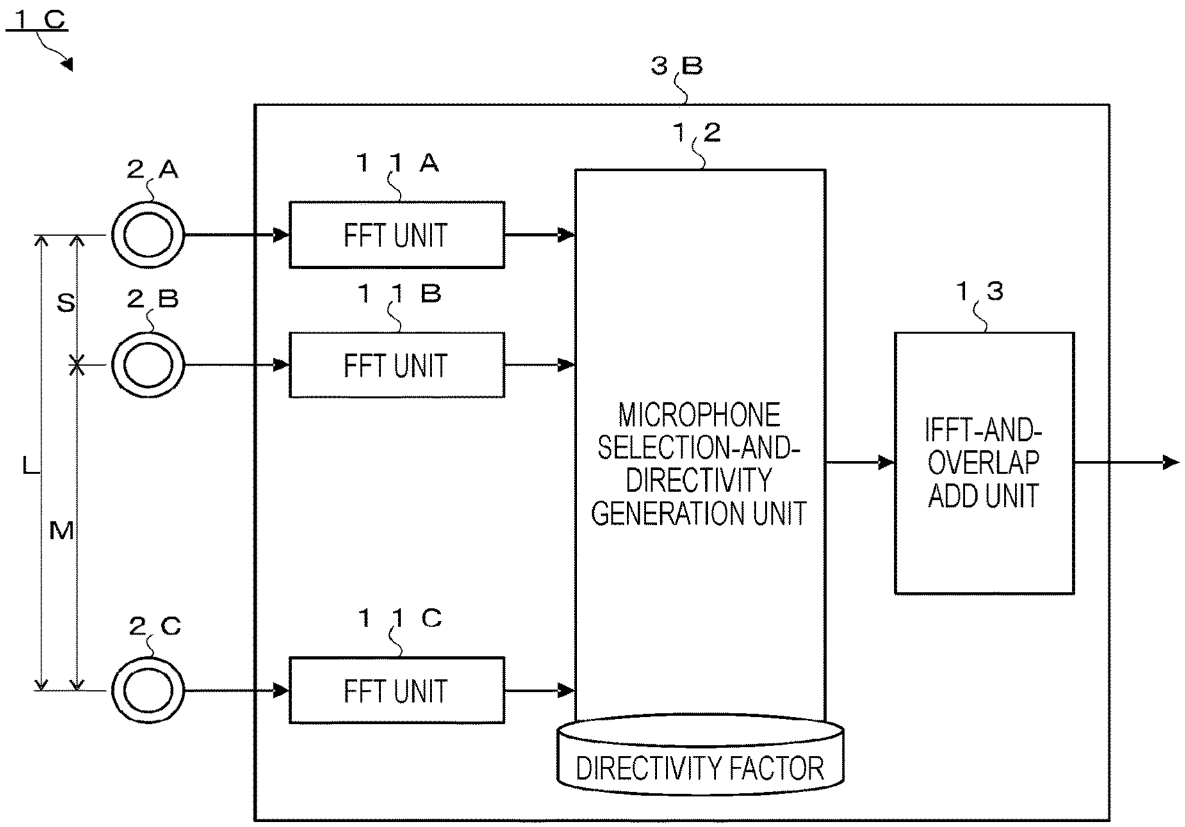
FIG. 7 is a block diagram illustrating a configuration example of an audio processing device according to a modified example.

FIG. 7 is a block diagram illustrating a configuration example of an audio processing device according to a modified example. Note that, in the present modified example, parts similar to those of the first embodiment are denoted by the same reference numerals, and the description thereof will be omitted or simplified. An audio processing device 1C in the present modified example includes the microphones 2A, 2B, and 2C described above, and a signal processing unit 3B.

The signal processing unit 3B includes three FFT units 11A, 11B, and 11C, a microphone selection-and-directivity generation unit 12, and an IFFT-and-overlap add unit 13. The microphones 2A, 2B, and 2C are respectively connected to the FFT units 11A, 11B, and 11C that perform fast Fourier transform (FFT). The FFT units 11A, 11B, and 11C are connected to the microphone selection-and-directivity generation unit 12 that selects a microphone for each band and performs directivity processing by using a signal corresponding to the selected microphone. The microphone selection-and-directivity generation unit 12 is connected to the IFFT-and-overlap add unit 13 that performs processing of inverse fast Fourier transform (IFFT) and overlap add.

In the audio processing device 1C, the microphones 2A, 2B, and 2C output audio signals to the FFT units 11A, 11B, and 11C, respectively. The FFT units 11A, 11B, and 11C perform fast Fourier transform on the input signals from the microphones 2A, 2B, and 2C, respectively, convert the input signals into signals in a frequency domain, and output the signals to the microphone selection-and-directivity generation unit 12. The microphone selection-and-directivity generation unit 12 selects a microphone to be used for each band, and performs directivity processing using a technique similar to that in the first embodiment described above by using an input signal corresponding to the selected microphone among the input signals from the FFT units 11A, 11B, and 11C and a predetermined directivity factor. Specifically, for the high frequency side, the input signals from the FFT units 11A and 11B corresponding to the narrowly spaced (space S) microphones 2A and 2B are used for the directivity processing, and for the low frequency side, the input signals from the FFT units 11A and 11C corresponding to the widely spaced (space L) microphones 2A and 2C are used for the directivity processing. Then, a result obtained by performing the directivity processing for each band is inversely transformed into an audio signal on a time axis by the IFFT-and-overlap add unit 13, and a unidirectional audio signal is output in a similar manner to the audio processing device 1 of the first embodiment.

Therefore, the audio processing device 1C according to this modified example can also achieve effects similar to those of the first embodiment described above.

Furthermore, for example, in the first embodiment described above, the configuration has been exemplified in which the frequency band is dividing into two, a high frequency and a low frequency, for which the processing is performed. However, this is not restrictive, and a configuration in which the processing is performed with the frequency band divided into three or more may be adopted. The same applies to other embodiments, other modified examples, and application examples. For example, the number of combinations of microphones in the first embodiment may be four (four combinations A, B, C, and D). In this case, assuming that the spaces between the microphones are expressed by combination A<combination B<combination C<combination D, the combination A is used for a high frequency, the combination B is used for a midrange-to-high frequency, the combination C is used for a midrange frequency, and the combination D is used for a low frequency. That is, widely spaced microphones at both ends are used for generation of directivity dedicated to a low frequency. In a similar manner, narrowly spaced microphones adjacent to each other are used for generation of directivity effective for a high frequency. Then, intermediately spaced microphones are used for generation of directivity appropriate for a midrange frequency and a midrange-to-high frequency. Then, they are subjected to filtering processing only in a necessary band, and synthesis is performed. Note that a band-pass filter (BPF) corresponding to a necessary band may be used as a filter unit that processes a midrange-to-high frequency and a midrange frequency.

Figure 8:
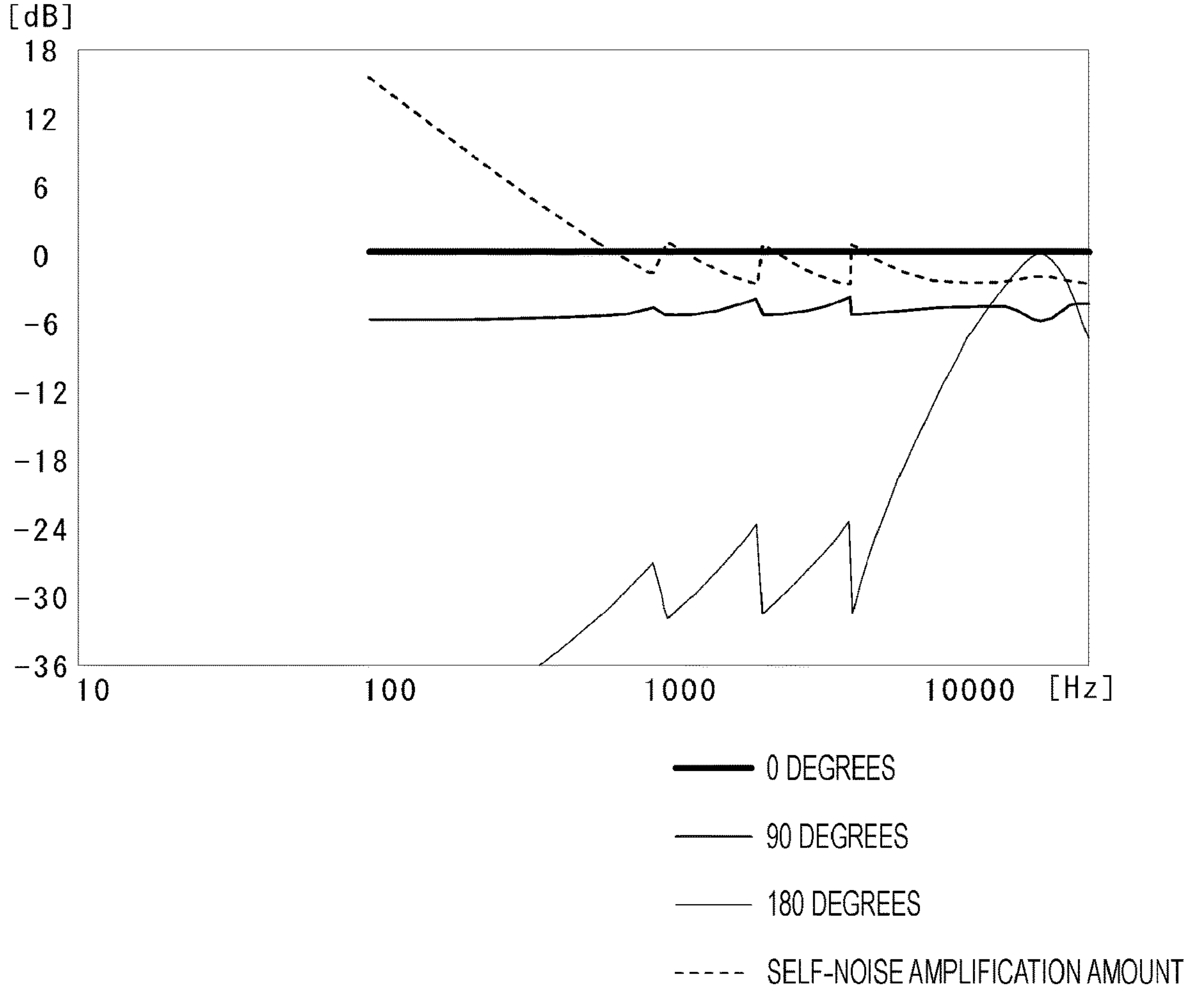
FIG. 8 is a graph illustrating a characteristic example of an audio signal in a case where four combinations are used.

FIG. 8 is a graph illustrating a characteristic example of an audio signal in a case where four combinations are used. Note that FIG. 8 illustrates characteristics in a case where the spaces between the microphones in the combination A, the combination B, the combination C, and the combination D are one, two, four, and seven centimeters, respectively, and an audio signal having a cardioid directivity is generated.

As illustrated, it can be seen that the audio processing device according to this modified example can achieve both an expansion of the frequency at which directivity is obtained and a reduction of self-noise. In particular, due to an advantage of directivity optimization, the frequency response of 0 degrees can also be flat at 0 dB. In this way, by increasing the number of parts into which the band is divided, it is possible to smoothen the directivity and generate a high-quality audio signal having an improved trade-off relationship between the amount of noise, the directivity, and the frequency response.

Moreover, for example, in the first embodiment described above, the microphones 2A, 2B, and 2C are arrayed linearly, but the array is not limited to a linear shape, and may be another array such as an annular shape or a lattice shape. Furthermore, not only a configuration of a planar two-dimensional array but also a configuration of a three-dimensional array may be adopted. Furthermore, it is not always necessary to adopt a configuration in which spaces with respect to one microphone (e.g., the microphone 2A in the first embodiment) are different. The same applies to other embodiments, other modified examples, and application examples.

Furthermore, for example, in the first embodiment described above, in order to change the sharpness of the directivity, a unidirectional audio signal is generated by each of the directivity generation units 4A and 4B, and one audio signal having unidirectionality is finally generated with the use of the unidirectional audio signals. However, this is not restrictive. For example, the directivity of the audio signal generated by each unit may be appropriately selected from omnidirectional, unidirectional, bidirectional, narrow directional, sharp directional, super directional, or the like depending on the purpose, intended use, or the like. Furthermore, the purpose of generation may be to change a direction of a directivity principal axis. The same applies to other embodiments, other modified examples, and application examples.

Moreover, for example, the audio processing device 1 in the first embodiment described above is an exemplification of a configuration in which one audio signal having unidirectionality is finally generated and output (monaural output configuration). Alternatively, a configuration in which a multichannel audio signal is generated and output may be adopted. The same applies to other embodiments, other modified examples, and application examples.

Figure 9:
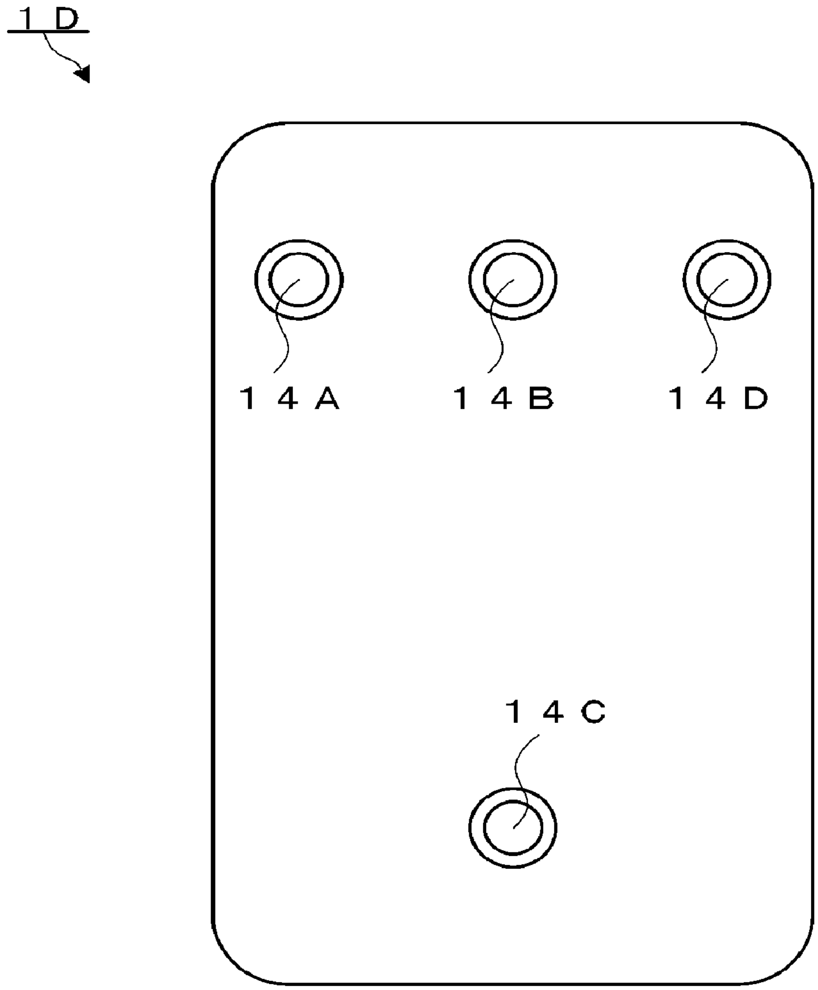
FIG. 9 is a diagram illustrating another configuration example of the audio processing device according to the modified example.

FIG. 9 is a diagram illustrating another configuration example of the audio processing device according to the modified example. Note that an audio processing device 1D in the present modified example differs from the first embodiment in that four microphones 14A, 14B, 14C, and 14D are included instead of the three microphones 2A, 2B, and 2C in the first embodiment. Individual configurations of the microphones 14A, 14B, 14C, and 14D are similar to those of the microphones 2A, 2B, and 2C in the first embodiment.

The microphones 14A, 14B, 14C, and 14D are arrayed in a T-shape as illustrated. The space between the microphone 14A at the upper left of the T-shape and the microphone 14B at the upper center is narrower than the space between the microphone 14A and the microphone 14C at the lower center. Furthermore, the space between the microphone 14D and the microphone 14B at the upper right of the T-shape is equal to the space between the microphones 14A and 14B. Then, the audio processing device 1D uses the microphones 14A, 14B, and 14C to generate a left side audio signal, and uses the microphones 14D, 14B, and 14C to generate a right side audio signal. That is, the microphones 14A, 14B, and 14C are used to perform processing similar to that of the first embodiment or the like and generate a unidirectional left side audio signal with a directivity principal axis inclined to the left, and the microphones 14D, 14B, and 14C are used to perform processing similar to that of the first embodiment or the like and generate a unidirectional right side audio signal with a directivity principal axis inclined to the right.

With this arrangement, also in the audio processing device 1D having a configuration for performing stereo output, effects similar to those of the first embodiment and the like described above can be obtained. Note that the array of the microphones here is not limited to the T-shaped array, and may be another array such as a V-shape.

Furthermore, the technologies disclosed in the present specification, such as the embodiments, modified examples, and application examples, may be combined to the extent possible. Furthermore, the effects described herein are merely illustrative and are not intended to be restrictive, and other effects may be obtained.

The present technology can also be configured as described below.

(1)

An audio processing device including:

a configuration in which a different microphone is used for generation of directivity depending on a frequency band.

(2)

The audio processing device according to (1), further including:

a plurality of directivity generation units, each of which generates a plurality of audio signals having a predetermined directivity by using a combination of a plurality of the microphones for generation of the directivity and using a plurality of the combinations of the microphones with spaces that are different from each other.

(3)

The audio processing device according to (2), further including:

a high pass filter that performs filtering processing on an audio signal generated by using the combination with a narrower space; and a low pass filter that performs filtering processing on an audio signal generated by using the combination with a wider space.

(4)

The audio processing device according to (3), further including:

a synthesis unit that performs synthesis from an output of the high pass filter and an output of the low pass filter.

(5)

The audio processing device according to (1), in which each one of a plurality of the microphones having different diameters is used for generation of a plurality of audio signals having a predetermined directivity.

(6)

The audio processing device according to any one of (1) to (4), further including:

a structure capable of adjusting spaces between a plurality of the microphones used for generation of the directivity.

(7)

The audio processing device according to any one of (2) to (4), further including the plurality of the microphones.

(8)

The audio processing device according to any one of (1) to (7), further including a structure attachable to an imaging device.

(9)

The audio processing device according to (2) or (7), in which the spaces are distances between centers of diameters of the microphones.

(10)

The audio processing device according to (2) or (7), in which a combination of the microphones set with a first space and a combination of the microphones set with a second space smaller than the first space are used.

(11)

The audio processing device according to (2) or (7), in which the plurality of the microphones is three or more microphones.

(12)

The audio processing device according to (2) or (7), in which the predetermined directivity is unidirectionality.

(13)

The audio processing device according to (12), in which the unidirectionality is any one of cardioid, supercardioid, or hypercardioid.

(14)

The audio processing device according to (2), (7), (12), or (13), in which the predetermined directivity is adjustable in accordance with an operation by a user.

(15)

The audio processing device according to (5), in which the microphones having different diameters differ from each other in frequency response and noise performance.

(16)

The audio processing device according to (15), in which the microphones having different diameters are unidirectional with each other.

(17)

The audio processing device according to (6), in which all of the plurality of the microphones are adjustable in position.

(18)

The audio processing device according to (6), in which only at least one of the plurality of the microphones is adjustable in position.

(19)

An audio processing method in which a different microphone is used for generation of directivity depending on a frequency band.

(20)

A program for causing a computer to execute an audio processing method in which a different microphone is used for generation of directivity depending on a frequency band.

5. Application Example

The technology according to the present disclosure can be applied to a variety of products. For example, the technology according to the present disclosure may be applied to an operating room system.

Figure 10:
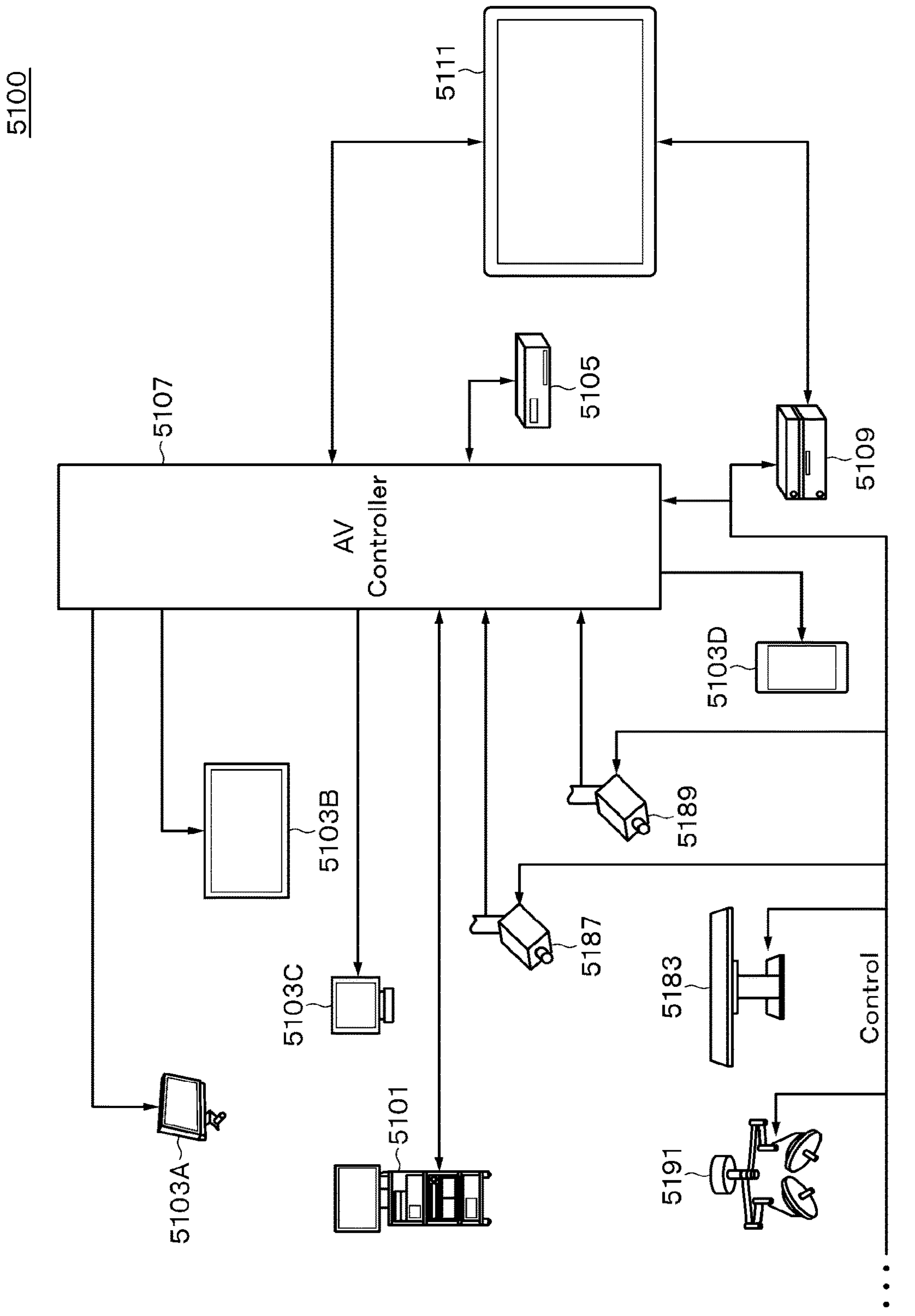
FIG. 10 is a diagram schematically illustrating an overall configuration of an operating room system.

FIG. 10 is a diagram schematically illustrating an overall configuration of an operating room system 5100 to which the technology according to the present disclosure can be applied. Referring to FIG. 10, the operating room system 5100 has a configuration in which a group of devices installed in the operating room are connected with each other via an audiovisual controller (AV controller) 5107 and an operating room control device 5109, and can cooperate with each other.

A variety of devices may be installed in the operating room. FIG. 10 illustrates, as an example, a group of various devices 5101 for endoscopic surgery, a ceiling camera 5187 that is provided on the ceiling of the operating room and images an area an operator is working on, an operating theater camera 5189 that is provided on the ceiling of the operating room and images a state of the entire operating room, a plurality of display devices 5103A to 5103D, a recorder 5105, a patient bed 5183, and an illuminating device 5191.

Here, among these devices, the group of devices 5101 belongs to an endoscopic surgery system 5113 described later, and includes an endoscope and a display device that displays an image captured by the endoscope. The devices that belong to the endoscopic surgery system 5113 are also referred to as medical-use equipment. On the other hand, the display devices 5103A to 5103D, the recorder 5105, the patient bed 5183, and the illuminating device 5191 are devices provided, separately from the endoscopic surgery system 5113, in the operating room, for example. These devices that do not belong to the endoscopic surgery system 5113 are also referred to as non-medical use equipment. The audiovisual controller 5107 and/or the operating room control device 5109 control operations of the medical equipment and the non-medical equipment in cooperation with each other.

The audiovisual controller 5107 integrally controls processing related to image display in the medical equipment and the non-medical equipment. Specifically, among the devices included in the operating room system 5100, the group of devices 5101, the ceiling camera 5187, and the operating theater camera 5189 can be devices (hereinafter also referred to as transmission source devices) having a function of transmitting information to be displayed during surgery (hereinafter also referred to as display information). Furthermore, the display devices 5103A to 5103D can be devices to which display information is output (hereinafter also referred to as output destination devices). Furthermore, the recorder 5105 can be a device that is both a transmission source device and an output destination device. The audiovisual controller 5107 has a function of controlling operations of a transmission source device and an output destination device, acquiring display information from the transmission source device, transmitting the display information to the output destination device, and displaying or recording the display information. Note that the display information includes various images captured during surgery and various types of information regarding surgery (e.g., physical information of a patient, past examination results, and information regarding a surgical procedure).

Specifically, information regarding an image of a surgical site in a body cavity of a patient imaged by the endoscope can be transmitted as display information from the group of devices 5101 to the audiovisual controller 5107. Furthermore, information regarding an image of the area the operator is working on captured by the ceiling camera 5187 can be transmitted as display information from the ceiling camera 5187. Furthermore, information regarding an image indicating the state of the entire operating room captured by the operating theater camera 5189 can be transmitted as display information from the operating theater camera 5189. Note that, in a case where there is another device having an imaging function in the operating room system 5100, the audiovisual controller 5107 may acquire, also from the other device, information regarding an image captured by the other device as display information.

Alternatively, for example, in the recorder 5105, information regarding these images captured in the past is recorded by the audiovisual controller 5107. The audiovisual controller 5107 can acquire information regarding the images captured in the past from the recorder 5105 as display information. Note that various types of information regarding surgery may also be recorded in the recorder 5105 in advance.

The audiovisual controller 5107 causes at least one of the display devices 5103A to 5103D, which are output destination devices, to display the acquired display information (that is, images captured during surgery and various types of information regarding surgery). In the illustrated example, the display device 5103A is a display device installed and suspended from the ceiling of the operating room, the display device 5103B is a display device installed on a wall surface of the operating room, the display device 5103C is a display device installed on a desk in the operating room, and the display device 5103D is a mobile device (e.g., a tablet personal computer (PC)) having a display function.

Furthermore, although not illustrated in FIG. 10, the operating room system 5100 may include a device outside the operating room. The device outside the operating room can be, for example, a server connected to a network constructed inside and outside a hospital, a PC used by medical staff, or a projector installed in a conference room in the hospital. In a case where there is such an external device outside the hospital, the audiovisual controller 5107 can also cause a display device in another hospital to display the display information via a video conference system or the like for telemedicine.

The operating room control device 5109 integrally controls processing other than processing related to image display in the non-medical equipment. For example, the operating room control device 5109 controls driving of the patient bed 5183, the ceiling camera 5187, the operating theater camera 5189, and the illuminating device 5191.

The operating room system 5100 is provided with a centralized operation panel 5111. Via the centralized operation panel 5111, a user can give an instruction regarding image display to the audiovisual controller 5107, or give an instruction regarding operation of the non-medical equipment to the operating room control device 5109. The centralized operation panel 5111 is constituted by a touch panel provided on a display surface of a display device.

Figure 11:
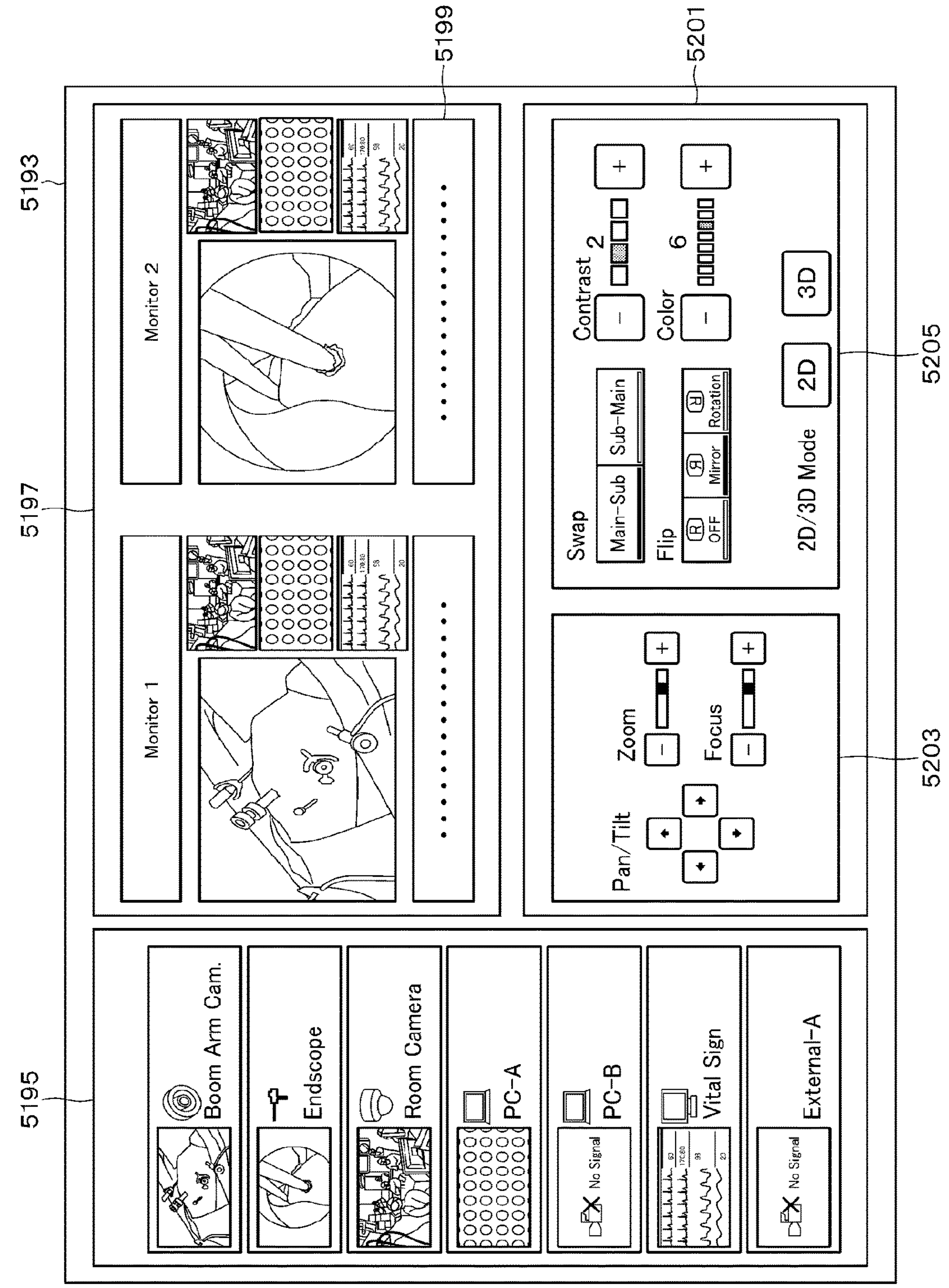
FIG. 11 is a diagram illustrating an example of display of an operation screen on a centralized operation panel.

FIG. 11 is a diagram illustrating an example of display of an operation screen on the centralized operation panel 5111. FIG. 11 illustrates, as an example, an operation screen for a case where two display devices are provided as output destination devices in the operating room system 5100. Referring to FIG. 11, an operation screen 5193 has a transmission source selection area 5195, a preview area 5197, and a control area 5201.

In the transmission source selection area 5195, a transmission source device provided in the operating room system 5100 and a thumbnail screen representing display information in the transmission source device are displayed in association with each other. A user can select display information to be displayed on the display devices from one of the transmission source devices displayed in the transmission source selection area 5195.

In the preview area 5197, previews of screens displayed on the two display devices (Monitor 1 and Monitor 2), which are output destination devices, are displayed. In the illustrated example, four images are displayed in picture-in-picture mode on one display device. The four images correspond to the display information transmitted from the transmission source device selected in the transmission source selection area 5195. One of the four images is displayed relatively large as a main image, and the remaining three images are displayed relatively small as sub-images. The user can switch between the main image and a sub image by appropriately selecting from among areas in which the four images are displayed. Furthermore, a status display area 5199 is provided below the areas in which the four images are displayed, and a status regarding surgery (e.g., elapsed time of surgery and physical information of a patient) can be appropriately displayed in the area.

The control area 5201 is provided with a transmission source operation area 5203 in which graphical user interface (GUI) components for operating the transmission source device are displayed, and an output destination operation area 5205 in which GUI components for operating the output destination devices are displayed. In the illustrated example, the transmission source operation area 5203 is provided with GUI components for performing various operations (pan, tilt, and zoom) on a camera in the transmission source device having an imaging function. The user can operate the camera in the transmission source device by appropriately selecting from among these GUI components. Note that, although not illustrated, in a case where the transmission source device selected in the transmission source selection area 5195 is a recorder (that is, in a case where an image that has been recorded in the recorder in the past is displayed in the preview area 5197), the transmission source operation area 5203 may be provided with GUI components for performing operations such as play, stop, rewind, and fast forward of the image.

Furthermore, the output destination operation area 5205 is provided with GUI components for performing various operations (swap, flip, color adjustment, contrast adjustment, and switching between 2D display and 3D display) on display on the display devices, which are the output destination devices. The user can operate the display on the display device by appropriately selecting from among these GUI components.

Note that the operation screen displayed on the centralized operation panel 5111 is not limited to the illustrated example. A user may be able to perform, via the centralized operation panel 5111, an operation input for each of the devices that are provided in the operating room system 5100 and can be controlled by the audiovisual controller 5107 and the operating room control device 5109.

Figure 12:
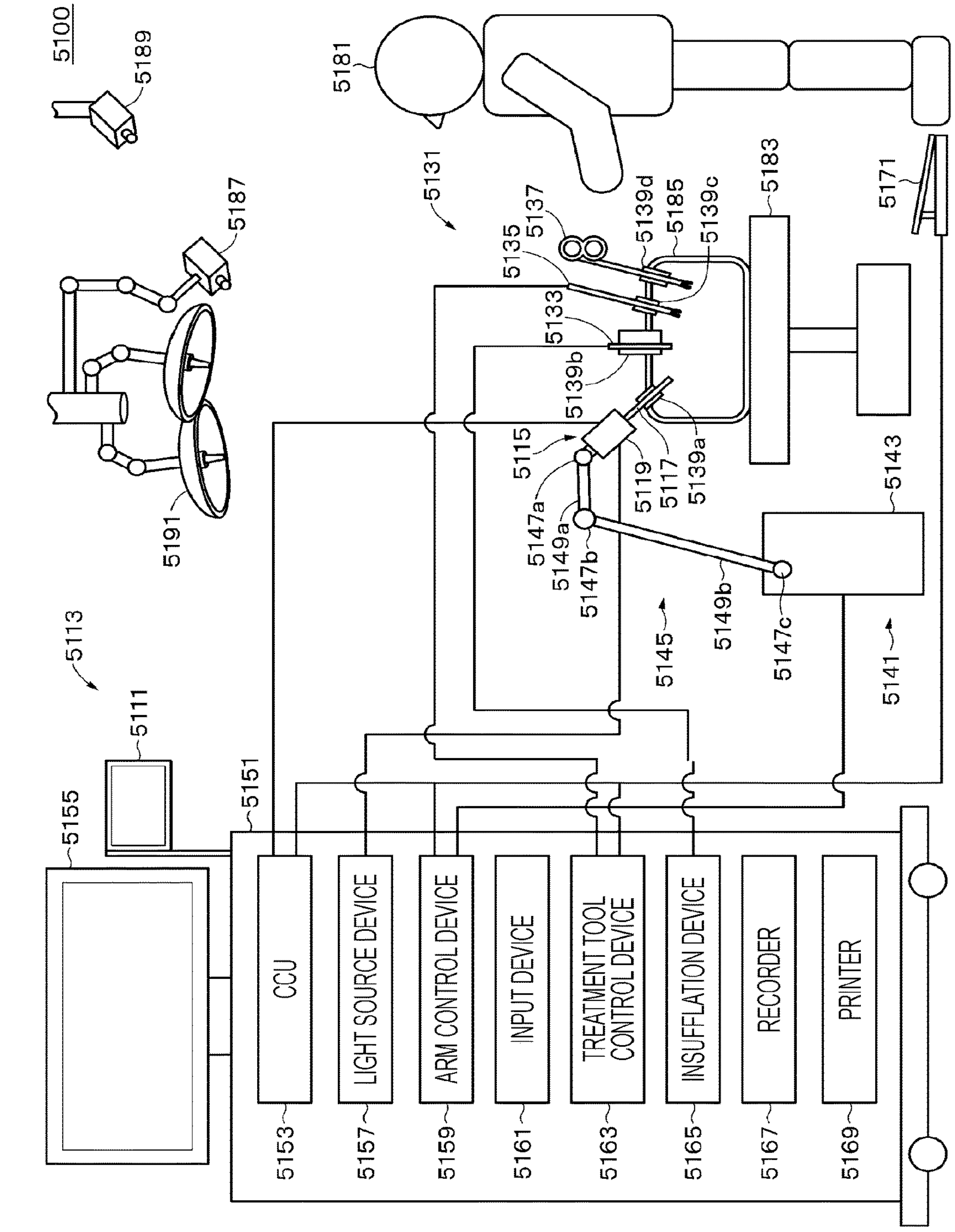
FIG. 12 is a diagram illustrating an example of a state of surgery for which the operating room system is used.

FIG. 12 is a diagram illustrating an example of a state of surgery for which the operating room system described above is used. The ceiling camera 5187 and the operating theater camera 5189 are provided on the ceiling of the operating room, and can image an area an operator (surgeon) 5181, who performs treatment on an affected part of a patient 5185 on the patient bed 5183, is working on, and the state of the entire operating room. The ceiling camera 5187 and the operating theater camera 5189 may have a magnification adjustment function, a focal length adjustment function, an imaging direction adjustment function, and the like. The illuminating device 5191 is provided on the ceiling of the operating room, and illuminates at least the area the operator 5181 is working on. The illuminating device 5191 may be appropriately adjustable in amount of emitted light, wavelength (color) of the emitted light, direction of emission of the light, and the like.

As illustrated in FIG. 10, the endoscopic surgery system 5113, the patient bed 5183, the ceiling camera 5187, the operating theater camera 5189, and the illuminating device 5191 are connected with each other via the audiovisual controller 5107 and the operating room control device 5109 (not illustrated in FIG. 12), and can cooperate with each other. The centralized operation panel 5111 is provided in the operating room, and as described above, a user can appropriately operate these devices in the operating room via the centralized operation panel 5111.

Hereinafter, a configuration of the endoscopic surgery system 5113 will be described in detail. As illustrated, the endoscopic surgery system 5113 includes an endoscope 5115, other surgical tools 5131, a support arm device 5141 that supports the endoscope 5115, and a cart 5151 on which various devices for endoscopic surgery are mounted.

In endoscopic surgery, an abdominal wall is not cut and opened, but is pierced with a plurality of tubular holeopening instruments called trocars 5139*a* to 5139*d*. Then, a lens barrel 5117 of the endoscope 5115 and the other surgical tools 5131 are inserted into a body cavity of the patient 5185 through the trocars 5139*a* to 5139*d*. In the illustrated example, an insufflation tube 5133, an energy treatment tool 5135, and forceps 5137 are inserted into the body cavity of the patient 5185 as the other surgical tools 5131. Furthermore, the energy treatment tool 5135 is used to perform incision and exfoliation of tissue, sealing of a blood vessel, or the like by using a high-frequency current or ultrasonic vibration. However, the illustrated surgical tools 5131 are merely an example, and various surgical tools generally used in endoscopic surgery, such as tweezers and a retractor, may be used as the surgical tools 5131.

An image of a surgical site in the body cavity of the patient 5185 captured by the endoscope 5115 is displayed on a display device 5155. The operator 5181 performs treatment such as excision of an affected part, for example, using the energy treatment tool 5135 or the forceps 5137 while viewing the image of the surgical site displayed on the display device 5155 in real time. Note that, although not illustrated, the insufflation tube 5133, the energy treatment tool 5135, and the forceps 5137 are supported by the operator 5181, an assistant, or the like during surgery.

(Support Arm Device)

The support arm device 5141 includes an arm 5145 extending from a base portion 5143. In the illustrated example, the arm 5145 includes joints 5147*a*, 5147*b*, and 5147*c*, and links 5149*a* and 5149*b*, and is driven by control of an arm control device 5159. The arm 5145 supports the endoscope 5115 so as to control its position and posture. With this arrangement, the position of the endoscope 5115 can be stably fixed.

(Endoscope)

The endoscope 5115 includes the lens barrel 5117 whose predetermined length from its distal end is inserted into the body cavity of the patient 5185, and a camera head 5119 connected to a proximal end of the lens barrel 5117. In the illustrated example, the endoscope 5115 configured as a so-called rigid endoscope having the lens barrel 5117 that is rigid is illustrated. Alternatively, the endoscope 5115 may be configured as a so-called flexible endoscope having the lens barrel 5117 that is flexible.

The lens barrel 5117 is provided with, at the distal end thereof, an opening portion in which an objective lens is fitted. The endoscope 5115 is connected with a light source device 5157. Light generated by the light source device 5157 is guided to the distal end of the lens barrel by a light guide extending inside the lens barrel 5117, and is emitted through the objective lens toward an observation target in the body cavity of the patient 5185. Note that the endoscope 5115 may be a forward-viewing endoscope, an oblique-viewing endoscope, or a side-viewing endoscope.

The camera head 5119 is provided with an optical system and an imaging element inside thereof, and light reflected from the observation target (observation light) is collected on the imaging element by the optical system. The imaging element photoelectrically converts the observation light to generate an electric signal corresponding to the observation light, that is, an image signal corresponding to an observation image. The image signal is transmitted to a camera control unit (CCU) 5153 as raw data. Note that the camera head 5119 has a function of adjusting a magnification and a focal length by appropriately driving the optical system.

Note that the camera head 5119 may be provided with a plurality of imaging elements in order to support, for example, stereoscopic viewing (3D display). In this case, the lens barrel 5117 is provided with a plurality of relay optical systems inside thereof to guide observation light to each one of the plurality of imaging elements.

(Various Devices Mounted on Cart)

The CCU 5153 is constituted by a central processing unit (CPU), a graphics processing unit (GPU), or the like, and integrally controls operations of the endoscope 5115 and the display device 5155. Specifically, the CCU 5153 performs, on an image signal received from the camera head 5119, various types of image processing for displaying an image based on the image signal, such as development processing (demosaic processing), for example. The CCU 5153 provides the display device 5155 with the image signal that has been subjected to the image processing. Furthermore, the audiovisual controller 5107 illustrated in FIG. 10 is connected to the CCU 5153. The CCU 5153 also provides the audiovisual controller 5107 with the image signal that has been subjected to the image processing. Furthermore, the CCU 5153 transmits a control signal to the camera head 5119 to control its driving. The control signal may contain information regarding imaging conditions such as the magnification and the focal length. The information regarding the imaging conditions may be input via an input device 5161 or may be input via the centralized operation panel 5111 described above.

The CCU 5153 controls the display device 5155 to display an image based on the image signal on which the CCU 5153 has performed image processing. In a case where, for example, the endoscope 5115 supports imaging with a high resolution such as 4K (3840 horizontal pixels×2160 vertical pixels) or 8K (7680 horizontal pixels×4320 vertical pixels), and/or in a case where the endoscope 5115 supports 3D display, a display device supporting high-resolution display and/or 3D display can be used accordingly as the display device 5155. In a case where imaging with a high resolution such as 4K or 8K is supported, a display device having a size of 55 inches or more can be used as the display device 5155 to provide more immersive feeling. Furthermore, a plurality of the display devices 5155 having different resolutions and sizes may be provided in accordance with the intended use.

The light source device 5157 includes a light source such as a light emitting diode (LED), for example, and supplies the endoscope 5115 with emitted light at the time of imaging a surgical site.

The arm control device 5159 is constituted by a processor such as a CPU, and operates in accordance with a predetermined program to control driving of the arm 5145 of the support arm device 5141 in accordance with a predetermined control method.

The input device 5161 is an input interface to the endoscopic surgery system 5113. A user can input various types of information and input instructions to the endoscopic surgery system 5113 via the input device 5161. For example, the user may input, via the input device 5161, various types of information regarding surgery, such as physical information of a patient and information regarding a surgical procedure. Furthermore, for example, the user may input, via the input device 5161, an instruction to drive the arm 5145, an instruction to change imaging conditions (the type of emitted light, the magnification and focal length, and the like) of the endoscope 5115, an instruction to drive the energy treatment tool 5135, and the like.

The type of the input device 5161 is not limited, and various known input devices may be used as the input device 5161. As the input device 5161, for example, a mouse, a keyboard, a touch panel, a switch, a foot switch 5171, and/or a lever can be used. In a case where a touch panel is used as the input device 5161, the touch panel may be provided on a display surface of the display device 5155.

Alternatively, the input device 5161 is a device worn by a user, such as a glasses-type wearable device or a head mounted display (HMD), for example, and various inputs are performed in accordance with a user's gesture or line-of-sight detected by these devices. Furthermore, the input device 5161 includes a camera capable of detecting a movement of a user, and various inputs are performed in accordance with a user's gesture or line-of-sight detected from a video captured by the camera. Moreover, the input device 5161 includes a microphone capable of collecting a user's voice, and various inputs are performed by voice via the microphone. As described above, the input device 5161 has a configuration in which various types of information can be input in a non-contact manner, and this allows, in particular, a user belonging to a clean area (e.g., the operator 5181) to operate equipment belonging to an unclean area in a non-contact manner. Furthermore, the user can operate the equipment while holding a surgical tool in hand, and this improves convenience of the user.

A treatment tool control device 5163 controls driving of the energy treatment tool 5135 for cauterization or incision of tissue, sealing of a blood vessel, or the like. An insufflation device 5165 sends gas through the insufflation tube 5133 into the body cavity in order to inflate the body cavity of the patient 5185 for the purpose of securing a field of view of the endoscope 5115 and securing a working space for the operator. A recorder 5167 is a device that can record various types of information regarding surgery. A printer 5169 is a device that can print various types of information regarding surgery in various formats such as text, images, or graphs.

A particularly characteristic configuration of the endoscopic surgery system 5113 will be described below in more detail.

(Support Arm Device)

The support arm device 5141 includes the base portion 5143 as a base, and the arm 5145 extending from the base portion 5143. In the illustrated example, the arm 5145 includes the plurality of joints 5147*a*, 5147*b*, and 5147*c*, and the plurality of links 5149*a* and 5149*b* coupled by the joint 5147*b*. However, FIG. 12 illustrates a configuration of the arm 5145 in a simplified manner for ease. In practice, the shapes, the numbers, and the arrangement of the joints 5147*a* to 5147*c* and the links 5149*a* and 5149*b*, the directions of rotation axes of the joints 5147*a* to 5147*c*, and the like can be appropriately set so that the arm 5145 has a desired degree of freedom. For example, the arm 5145 may suitably have a configuration that enables six or more degrees of freedom. With this arrangement, the endoscope 5115 can be freely moved within a movable range of the arm 5145, and the lens barrel 5117 of the endoscope 5115 can be inserted into the body cavity of the patient 5185 from a desired direction.

The joints 5147*a* to 5147*c* are provided with actuators, and the joints 5147*a* to 5147*c* have a configuration that enables rotation about a predetermined rotation axis by driving of the actuators. The arm control device 5159 controls the driving of the actuators, thereby controlling a rotation angle of each of the joints 5147*a* to 5147*c*, and controlling the driving of the arm 5145. With this arrangement, the position and posture of the endoscope 5115 can be controlled. At this time, the arm control device 5159 can control the driving of the arm 5145 by various known control methods such as force control or position control.

For example, the position and posture of the endoscope 5115 may be controlled by the operator 5181 performing an appropriate operation input via the input device 5161 (including the foot switch 5171), thereby causing the arm control device 5159 to appropriately control the driving of the arm 5145 in accordance with the operation input. With this control, the endoscope 5115 at a distal end of the arm 5145 can be moved from an optional position to an optional position, and then fixedly supported at the position after the movement. Note that the arm 5145 may be operated by a so-called master-slave method. In this case, the arm 5145 can be remotely controlled by a user via the input device 5161 installed at a location away from an operating room.

Furthermore, in a case where the force control is applied, so-called power assist control may be performed in which the arm control device 5159 receives an external force from a user and drives the actuators of the corresponding joints 5147*a* to 5147*c* so that the arm 5145 moves smoothly in accordance with the external force. With this arrangement, when the user moves the arm 5145 while directly touching the arm 5145, the arm 5145 can be moved with a relatively light force. Thus, the endoscope 5115 can be moved more intuitively and with a simpler operation, and this improves convenience of the user.

Here, in general, the endoscope 5115 has been supported by a doctor called an endoscopist during endoscopic surgery. On the other hand, by using the support arm device 5141, the position of the endoscope 5115 can be fixed more securely without manual operation. This makes it possible to stably obtain an image of a surgical site and smoothly perform surgery.

Note that the arm control device 5159 is not necessarily provided at the cart 5151. Furthermore, the arm control device 5159 is not necessarily one device. For example, the arm control devices 5159 may be provided one for each of the joints 5147*a* to 5147*c* of the arm 5145 of the support arm device 5141, and a plurality of the arm control devices 5159 may cooperate with one another to control the driving of the arm 5145.

(Light Source Device)

The light source device 5157 supplies the endoscope 5115 with emitted light at the time of imaging a surgical site. The light source device 5157 is constituted by a white light source including, for example, an LED, a laser light source, or a combination thereof. At this time, in a case where the white light source is constituted by a combination of RGB laser light sources, an output intensity and output timing of each color (each wavelength) can be controlled with high precision, and this enables white balance adjustment of a captured image at the light source device 5157. Furthermore, in this case, an image for each of R, G, and B can be captured in a time-division manner by emitting laser light from each of the RGB laser light sources to an observation target in a time-division manner, and controlling driving of the imaging element of the camera head 5119 in synchronization with the emission timing. According to this method, a color image can be obtained without providing a color filter in the imaging element.

Furthermore, driving of the light source device 5157 may be controlled so that the intensity of light to be output changes at a predetermined time interval. By controlling the driving of the imaging element of the camera head 5119 in synchronization with the timing of the change in the light intensity, acquiring images in a time-division manner, and generating a composite image from the images, a high dynamic range image without so-called blocked up shadows or blown out highlights can be generated.

Furthermore, the light source device 5157 may have a configuration in which light can be supplied in a predetermined wavelength band that can be used for special light observation. In special light observation, for example, by utilizing wavelength dependence of light absorption in body tissue, so-called narrow band imaging is performed in which a predetermined tissue such as a blood vessel in a mucosal surface layer is imaged with high contrast by emitting light in a band narrower than that of light emitted during normal observation (that is, white light). Alternatively, in special light observation, fluorescence observation may be performed in which an image is obtained by fluorescence generated by emitting excitation light. In fluorescence observation, for example, excitation light is emitted to body tissue and fluorescence from the body tissue is observed (autofluorescence observation), or a fluorescent image is obtained by locally injecting a reagent such as indocyanine green (ICG) into body tissue and emitting excitation light corresponding to a fluorescence wavelength of the reagent to the body tissue. The light source device 5157 may have a configuration in which narrow-band light and/or excitation light that can be used for such special light observation can be supplied.

(Camera Head and CCU)

Figure 13:
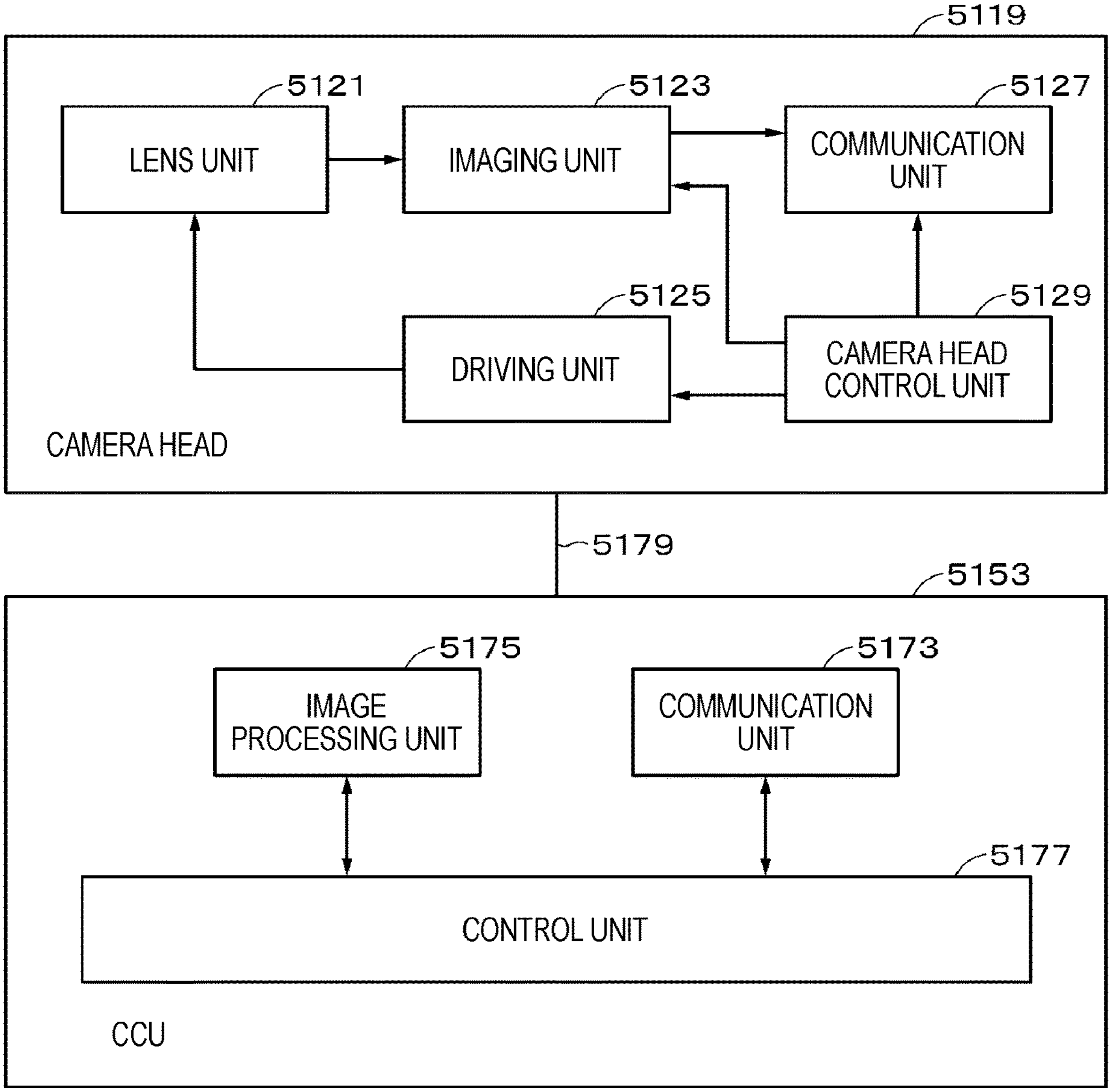
FIG. 13 is a block diagram illustrating an example of a functional configuration of a camera head and a CCU illustrated in FIG. 12.

Functions of the camera head 5119 of the endoscope 5115 and the CCU 5153 will be described in more detail with reference to FIG. 13. FIG. 13 is a block diagram illustrating an example of a functional configuration of the camera head 5119 and the CCU 5153 illustrated in FIG. 12.

Referring to FIG. 13, the camera head 5119 has functions including a lens unit 5121, an imaging unit 5123, a driving unit 5125, a communication unit 5127, and a camera head control unit 5129. Furthermore, the CCU 5153 has functions including a communication unit 5173, an image processing unit 5175, and a control unit 5177. The camera head 5119 and the CCU 5153 are connected by a transmission cable 5179 to allow two-way communication.

First, the functional configuration of the camera head 5119 will be described. The lens unit 5121 is an optical system provided at a connection with the lens barrel 5117. Observation light taken in from the distal end of the lens barrel 5117 is guided to the camera head 5119 and enters the lens unit 5121. The lens unit 5121 is constituted by a combination of a plurality of lenses including a zoom lens and a focus lens. Optical characteristics of the lens unit 5121 are adjusted so that observation light may be collected on a light receiving surface of an imaging element of the imaging unit 5123. Furthermore, the zoom lens and the focus lens have a configuration in which their positions can be moved on an optical axis for adjustment of a magnification and a focus of a captured image.

The imaging unit 5123 includes the imaging element, and is arranged at a stage subsequent to the lens unit 5121. Observation light that has passed through the lens unit 5121 is collected on the light receiving surface of the imaging element, and an image signal corresponding to an observation image is generated by photoelectric conversion. The image signal generated by the imaging unit 5123 is provided to the communication unit 5127.

As the imaging element included in the imaging unit 5123, for example, a complementary metal oxide semiconductor (CMOS) type image sensor that has a Bayer array and can capture a color image is used. Note that, as the imaging element, an imaging element capable of capturing a high-resolution image of, for example, 4K or more may be used. An image of a surgical site can be obtained with a high resolution, and this allows the operator 5181 to grasp the state of the surgical site in more detail, and proceed with surgery more smoothly.

Furthermore, the imaging element included in the imaging unit 5123 has a configuration including a pair of imaging elements, one for acquiring a right-eye image signal and the other for acquiring a left-eye image signal supporting 3D display. The 3D display allows the operator 5181 to grasp the depth of living tissue in the surgical site more accurately. Note that, in a case where the imaging unit 5123 has a multi-plate type configuration, a plurality of the lens units 5121 is provided for the corresponding imaging elements.

Furthermore, the imaging unit 5123 is not necessarily provided in the camera head 5119. For example, the imaging unit 5123 may be provided inside the lens barrel 5117 just behind the objective lens.

The driving unit 5125 is constituted by an actuator, and the camera head control unit 5129 controls the zoom lens and the focus lens of the lens unit 5121 to move by a predetermined distance along the optical axis. With this arrangement, the magnification and the focus of an image captured by the imaging unit 5123 can be appropriately adjusted.

The communication unit 5127 is constituted by a communication device for transmitting and receiving various types of information to and from the CCU 5153. The communication unit 5127 transmits an image signal obtained from the imaging unit 5123 as raw data to the CCU 5153 via the transmission cable 5179. At this time, it is preferable that the image signal be transmitted by optical communication in order to display a captured image of a surgical site with a low latency. This is because, during surgery, the operator 5181 performs surgery while observing a state of an affected part from a captured image, and it is required that a moving image of the surgical site be displayed in real time as much as possible for safer and more reliable surgery. In a case where optical communication is performed, the communication unit 5127 is provided with a photoelectric conversion module that converts an electric signal into an optical signal. An image signal is converted into an optical signal by the photoelectric conversion module, and then transmitted to the CCU 5153 via the transmission cable 5179.

Furthermore, the communication unit 5127 receives a control signal for controlling driving of the camera head 5119 from the CCU 5153. The control signal contains information regarding imaging conditions such as information for specifying a frame rate of a captured image, information for specifying an exposure value at the time of imaging, and/or information for specifying a magnification and focus of the captured image. The communication unit 5127 provides the received control signal to the camera head control unit 5129. Note that the control signal from the CCU 5153 may also be transmitted by optical communication. In this case, the communication unit 5127 is provided with a photoelectric conversion module that converts an optical signal into an electric signal. The control signal is converted into an electric signal by the photoelectric conversion module, and then provided to the camera head control unit 5129.

Note that the imaging conditions such as the frame rate, the exposure value, the magnification, and the focus described above are automatically set by the control unit 5177 of the CCU 5153 on the basis of an acquired image signal. That is, the endoscope 5115 has a so-called auto exposure (AE) function, an auto focus (AF) function, and an auto white balance (AWB) function.

The camera head control unit 5129 controls the driving of the camera head 5119 on the basis of the control signal from the CCU 5153 received via the communication unit 5127. For example, the camera head control unit 5129 controls driving of the imaging element of the imaging unit 5123 on the basis of information for specifying a frame rate of a captured image and/or information for specifying exposure at the time of imaging. Furthermore, for example, the camera head control unit 5129 appropriately moves the zoom lens and the focus lens of the lens unit 5121 via the driving unit 5125 on the basis of information for specifying a magnification and a focus of a captured image. The camera head control unit 5129 may further include a function of storing information for recognizing the lens barrel 5117 and the camera head 5119.

Note that, by arranging the configurations of the lens unit 5121, the imaging unit 5123, and the like in a hermetically sealed structure having high airtightness and waterproofness, the camera head 5119 can have resistance to autoclave sterilization.

Next, the functional configuration of the CCU 5153 will be described. The communication unit 5173 is constituted by a communication device for transmitting and receiving various types of information to and from the camera head 5119. The communication unit 5173 receives an image signal transmitted from the camera head 5119 via the transmission cable 5179. At this time, as described above, the image signal can be suitably transmitted by optical communication. In this case, to support optical communication, the communication unit 5173 is provided with a photoelectric conversion module that converts an optical signal into an electric signal. The communication unit 5173 provides the image processing unit 5175 with the image signal converted into an electric signal.

Furthermore, the communication unit 5173 transmits a control signal for controlling the driving of the camera head 5119 to the camera head 5119. The control signal may also be transmitted by optical communication.

The image processing unit 5175 performs various types of image processing on an image signal that is raw data transmitted from the camera head 5119. Examples of the image processing include various types of known signal processing such as development processing, high image quality processing (such as band emphasis processing, super-resolution processing, noise reduction (NR) processing, and/or camera shake correction processing), and/or enlargement processing (electronic zoom processing). Furthermore, the image processing unit 5175 performs demodulation processing on the image signal for performing AE, AF, and AWB.

The image processing unit 5175 is constituted by a processor such as a CPU or a GPU, and the image processing and demodulation processing described above can be performed by the processor operating in accordance with a predetermined program. Note that, in a case where the image processing unit 5175 is constituted by a plurality of GPUs, the image processing unit 5175 appropriately divides information related to the image signal, and image processing is performed in parallel by the plurality of GPUs.

The control unit 5177 performs various controls regarding capturing of an image of a surgical site by the endoscope 5115 and display of the captured image. For example, the control unit 5177 generates a control signal for controlling the driving of the camera head 5119. At this time, in a case where imaging conditions have been input by a user, the control unit 5177 generates a control signal on the basis of the input by the user. Alternatively, in a case where the endoscope 5115 has an AE function, an AF function, and an AWB function, the control unit 5177 appropriately calculates an optimal exposure value, focal length, and white balance in accordance with a result of demodulation processing performed by the image processing unit 5175, and generates a control signal.

Furthermore, the control unit 5177 causes the display device 5155 to display an image of a surgical site on the basis of an image signal on which the image processing unit 5175 has performed image processing. At this time, the control unit 5177 uses various image recognition technologies to recognize various objects in the image of the surgical site. For example, the control unit 5177 can recognize a surgical tool such as forceps, a specific living body site, bleeding, mist at the time of using the energy treatment tool 5135, and the like by detecting a shape, color, and the like of an edge of an object in the image of the surgical site. When the image of the surgical site is displayed on the display device 5155, the control unit 5177 superimposes various types of surgery support information upon the image of the surgical site using results of the recognition. The surgery support information is superimposed and presented to the operator 5181, and this allows surgery to be performed more safely and reliably.

The transmission cable 5179 connecting the camera head 5119 and the CCU 5153 is an electric signal cable that supports electric signal communication, an optical fiber cable that supports optical communication, or a composite cable thereof.

Here, in the illustrated example, wired communication is performed using the transmission cable 5179, but wireless communication may be performed between the camera head 5119 and the CCU 5153. In a case where wireless communication is performed between the two, the transmission cable 5179 does not need to be laid in the operating room. This may resolve a situation in which movement of medical staff in the operating room is hindered by the transmission cable 5179.

The example of the operating room system 5100 to which the technology according to the present disclosure can be applied has been described above. Note that, here, a case where a medical system for which the operating room system 5100 is used is the endoscopic surgery system 5113 has been described as an example, but the configuration of the operating room system 5100 is not limited to such an example. For example, the operating room system 5100 may be used for a flexible endoscope system for examination or a microscopic surgery system instead of the endoscopic surgery system 5113.

The microphones according to the present disclosure can be suitably used for the input device 5161 among the configurations described above. Furthermore, the signal processing device according to the present disclosure can be suitably used for the CUC 5153 among the configurations described above. In the medical field, there are an increasing number of scenes where an audio signal of, for example, an instruction from an operator (doctor) in an operating room, a conversation such as a report or a message, or communication with a voice agent is recorded together with a video signal. By applying the present disclosure, it is possible to record an audio signal after adjusting the directivity so as to correspond to the position of an operator acquired in advance by image recognition or the like. Furthermore, it is possible to record an audio signal after adjusting the directivity so as not to record an interference sound such as noise of an irrelevant person, opening and closing of a door, or a device.

REFERENCE SIGNS LIST

1, 1A, 1B, 1C, 1D Audio processing device
2A, 2B, 2C, 8, 9, 10A, 10B, 10C, 14A, 14B, 14C, 14D Microphone
3, 3A, 3B Signal processing device
4A, 4B Directivity generation unit
5 First filter unit
6 Second filter unit
7 Synthesis unit
11A, 11B, 11C FFT unit
12 Microphone selection-and-directivity generation unit
13 IFFT-and-overlap add unit

The invention claimed is:

1. An audio processing device, comprising:

a plurality of microphones arranged in a shape other than a line;

a plurality of directivity generation circuits, each of which is configured to generate a plurality of audio signals having a predetermined directivity by using a combination of a plurality of the microphones for generation of the directivity and using a plurality of the combinations of the microphones with spaces therebetween that are different from each other, wherein a first directivity generation circuit, of the plurality of directivity generation circuits, is configured to generate a unidirectional left side audio signal with a directivity principle axis aligned to the left using a first plurality of the microphones, and a second directivity generation circuit, of the plurality of directivity generation circuits, is configured to generate a unidirectional right side audio signal with a directivity principle axis aligned to the right using a second plurality of microphones different from the first plurality of microphones, wherein at least one of the plurality of microphones is in both the first plurality of microphones and the second plurality of microphones.

2. An audio processing device, comprising:

a plurality of microphones having different diameters and configured to generate a corresponding plurality of audio signals having a predetermined directivity, wherein the plurality of microphones differ from each other in frequency response and noise performance and are unidirectional with each other;

a high-pass filter configured to perform filtering processing on a first audio signal generated by a first microphone, of the plurality of microphones, having a first diameter;

a low-pass filter configured to perform filtering processing on a second audio signal generated by a second microphone, of the plurality of microphones, having a second diameter greater than the first diameter; and a synthesis circuit configured to perform synthesis from an output of the high-pass filter and an output of the low-pass filter.

3. An audio processing device, comprising:

a plurality of microphones;

a plurality of directivity generation circuits, each of which is configured to generate a plurality of audio signals having a predetermined directivity by using a combination of a plurality of the microphones for generation of the directivity and using a plurality of the combinations of the microphones with spaces therebetween that are different from each other; and a structure configured to adjust spaces between a plurality of the microphones used for generation of the directivity.

4. The audio processing device according to claim 3, wherein the structure is attachable to an imaging device.

5. The audio processing device according to claim 3, wherein the spaces are distances between centers of diameters of the microphones.

6. The audio processing device according to claim 3, wherein a combination of the microphones set with a first space and a combination of the microphones set with a second space smaller than the first space are used.

7. The audio processing device according to claim 3, wherein the plurality of the microphones is three or more microphones.

8. The audio processing device according to claim 3, wherein the predetermined directivity is unidirectionality.

9. The audio processing device according to claim 8, wherein the unidirectionality is one of cardioid, supercardioid, and hypercardioid.

10. The audio processing device according to claim 3, wherein the predetermined directivity is adjustable in accordance with an operation by a user.

11. The audio processing device according to claim 3, wherein all of the plurality of the microphones are adjustable in position.

12. The audio processing device according to claim 3, wherein only at least one of the plurality of the microphones is adjustable in position.

13. The audio processing device of claim 1, wherein the plurality of microphones include four microphones arranged in a T-shape.

14. The audio processing device of claim 1, wherein the plurality of microphones are arranged in a V-shape.

* * * * *